US012457583B2

(12) United States Patent
Agiwal

(10) Patent No.: US 12,457,583 B2
(45) Date of Patent: Oct. 28, 2025

(54) METHOD AND APPARATUS FOR SMALL DATA TRANSMISSION IN WIRELESS COMMUNICATION SYSTEM

(71) Applicant: Samsung Electronics Co., Ltd., Suwon-si (KR)

(72) Inventor: Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 386 days.

(21) Appl. No.: 18/147,145

(22) Filed: Dec. 28, 2022

(65) Prior Publication Data
US 2023/0209504 A1 Jun. 29, 2023

(30) Foreign Application Priority Data
Dec. 28, 2021 (KR) .................. 10-2021-0189939

(51) Int. Cl.
*H04W 68/02* (2009.01)

(52) U.S. Cl.
CPC .................. *H04W 68/02* (2013.01)

(58) Field of Classification Search
CPC .................................................. H04W 68/02
USPC ........................................................ 455/458
See application file for complete search history.

(56) References Cited

U.S. PATENT DOCUMENTS

| 2019/0159168 A1 | 5/2019 | Wang et al. | |
| 2021/0307055 A1* | 9/2021 | Tsai | ............... H04W 76/30 |
| 2021/0314914 A1 | 10/2021 | Agiwal | |

OTHER PUBLICATIONS

Samsung, 'Configured Grant based Small Data Transmission', R2-2100145, 3GPP TSG-RAN2 Meeting #113 Electronic, Jan. 14, 2021.
Huawei et al., 'Control Plane Common aspects for SDT', R2-2110595, 3GPP TSG-RAN WG2 #116-e, E-meeting, Oct. 22, 2021.
Huawei et al., 'Small data transmission with CG-based scheme', R2-2101213, 3GPP TSG-RAN WG2 #113-e, E-meeting, Jan. 15, 2021.
International Search Report dated Mar. 31, 2023, issued in International Patent Application No. PCT/KR2022/021505.
Huawei et al: Running MAC CR for Small Data, 3GPP Draft; R2-2107494, 3rd Generation Partnership Project (3GPP), Mobile Competence Centre ; 650, Route Des Lucioles ; F-06921 Sophia-Antipolis Cedex ; France, RAN WG2, Aug. 12, 2021.
Intel Corporation: Discussion on the scope for Rel-18 SDT, 3GPP Draft; RP-213010, 3rd Generation Partnership Project (3GPP), Mobile Competence Centre ; 650, Route Des Lucioles ; F-06921 Sophia-Antipolis Cedex ; France, TSG RAN, Nov. 29, 2021.
Extended European Search Report dated Feb. 21, 2025, issued in a European Application No. 22916749.9.

* cited by examiner

*Primary Examiner* — Joel Ajayi
(74) *Attorney, Agent, or Firm* — Jefferson IP Law, LLP

(57) ABSTRACT

The disclosure relates to a 5G or 6G communication system for supporting a higher data transmission rate. A method performed by a base station in a mobile communication system is provided. The method includes receiving a downlink (DL) data for a user equipment (UE), determining whether a volume of the DL data is less than a data volume threshold, and in case that the volume of the DL data is less than the data volume threshold, transmitting, to the UE, a paging message including an inactive radio network temporary identifier (I-RNTI) and a mobile terminated small data transmission (MT-SDT) indication.

20 Claims, 5 Drawing Sheets

METHOD AND APPARATUS FOR SMALL DATA TRANSMISSION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0189939, filed on Dec. 28, 2021, in the Korean Intellectual Property Office, the disclosure of which is incorporated by reference herein in its entirety.

BACKGROUND

1. Field

The disclosure relates to a wireless communication system. More particularly, the disclosure relates to a method and apparatus for a small data transmission in wireless communication system.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Mobile terminated small data transmission (MT-SDT) i.e., downlink (DL)-triggered small data is not yet supported in fifth generation wireless communication system.

Aspects of the disclosure are to address at least the above-mentioned problems and/or disadvantages and to provide at least the advantages described below. Accordingly, an aspect of the disclosure is to provide a method and apparatus for a small data transmission in wireless communication system.

Additional aspects will be set forth in part in the description which follows and, in part, will be apparent from the description, or may be learned by practice of the presented embodiments.

In accordance with an aspect of the disclosure, a method performed by a base station in a mobile communication system is provided. The method includes receiving a downlink (DL) data for a user equipment (UE), determining whether a volume of the DL data is less than a data volume threshold, and in case that the volume of the DL data is less than the data volume threshold, transmitting, to the UE, a paging message including an inactive radio network temporary identifier (I-RNTI) and a mobile terminated small data transmission (MT-SDT) indication.

In accordance with another aspect of the disclosure, a base station in a mobile communication system is provided. The base station includes a transceiver and a controller. The controller is configured to receive, via the transceiver, a DL data for a UE, determine whether a volume of the DL data is less than a data volume threshold, and in case that the volume of the DL data is less than the data volume threshold, transmit, to the UE via the transceiver, a paging message including an I-RNTI and an MT-SDT indication.

The disclosure provides benefits such as reducing signaling overhead and UE power consumption by not transitioning to radio resource control (RRC)_CONNECTED and reducing latency by allowing fast transmission of (small and infrequent) packets.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
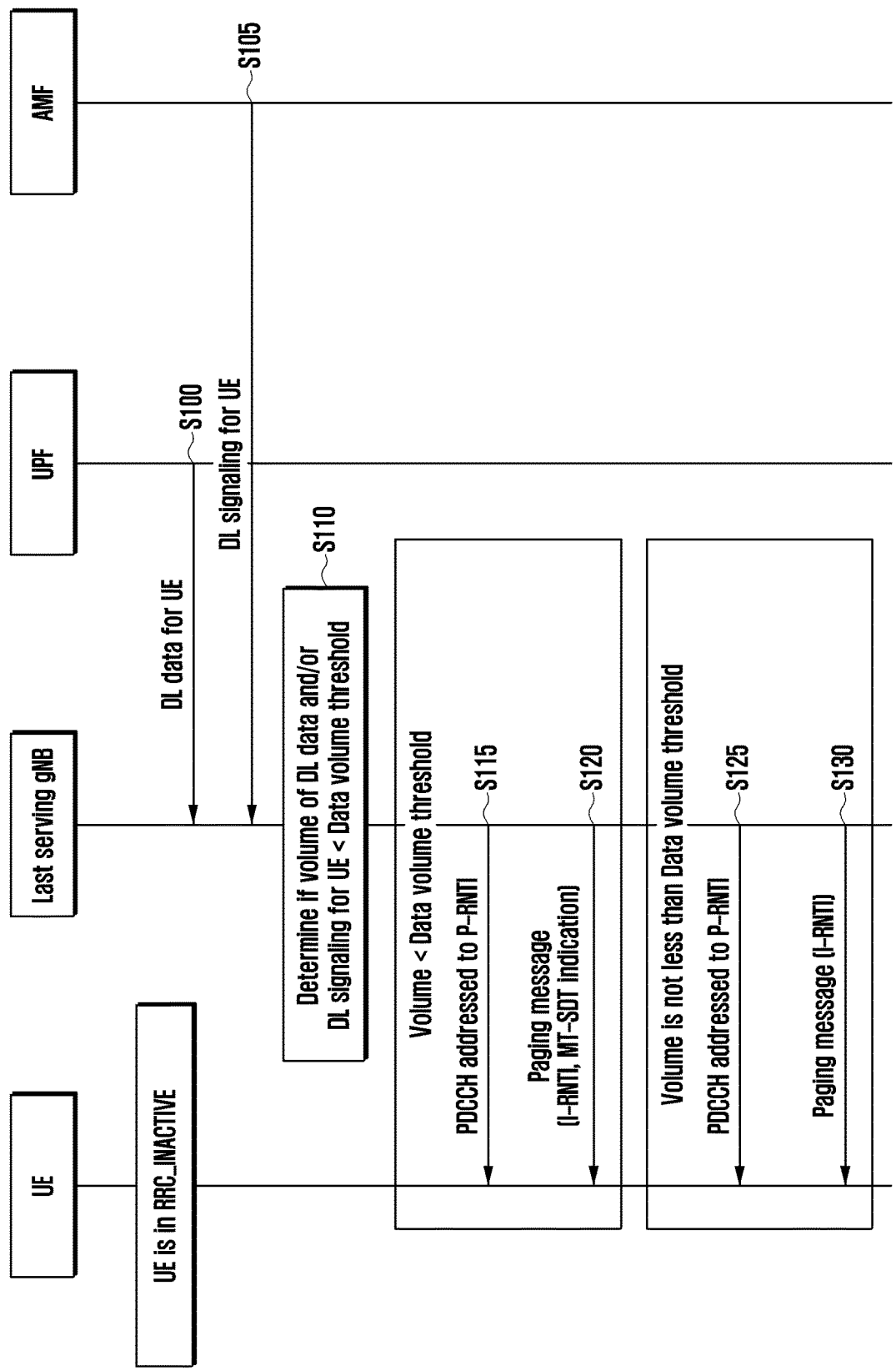
FIG. 1 illustrates a radio access network (RAN) paging via one or more cells of the last serving next generation node B (gNB) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), 5G NB (5GNB), or gNB.

The "UE" is an entity communicating with a BS and may be referred to as UE, device, mobile station (MS), mobile equipment (ME), or terminal.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system (also referred as next generation radio or NR) is being developed to meet the growing demand for high speed data services, support ultra-reliability and low latency applications.

The fifth generation wireless communication system supports not only lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few examples of use cases in the fifth generation wireless communication system wireless system that are expected to address are enhanced Mobile Broadband (eMBB), massive Machine Type Communication (m-MTC), ultra-reliable low latency communication (URLLC) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enablers for autonomous cars.

In the fifth generation wireless communication system operating in higher frequency (mmWave) bands, UE and gNB communicates with each other using Beamforming. Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can be also referred as transmit (TX) beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of receive (RX) beam patterns of different directions. Each of these receive patterns can be also referred as receive (RX) beam.

The fifth generation wireless communication system, supports standalone mode of operation as well dual connectivity (DC). In DC a multiple Rx/Tx UE may be configured to utilize resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in RRC_CONNECTED is configured to utilize radio resources provided by two distinct schedulers, located in two different nodes connected via a non-ideal backhaul and providing either evolved-universal terrestrial radio access (E-UTRA) (i.e. if the node is an ng-eNB) or NR access (i.e. if the node is a gNB). In NR for a UE in RRC_CONNECTED not configured with carrier aggregation (CA)/DC there is only one serving cell comprising of the primary cell. For a UE in RRC_CONNECTED configured with CA/DC the term 'serving cells' is used to denote the set of cells comprising of the Special Cell(s)

(SpCell(s)) and all secondary cells. In NR the term Master Cell Group (MCG) refers to a group of serving cells associated with the Master Node, comprising of the PCell and optionally one or more SCells. In NR the term Secondary Cell Group (SCG) refers to a group of serving cells associated with the Secondary Node, comprising of the PSCell and optionally one or more SCells. In NR primary cell (PCell) refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. Primary SCG Cell (PSCell) refers to a serving cell in SCG in which the UE performs random access when performing the Reconfiguration with Sync procedure. For Dual Connectivity operation the term SpCell (i.e. Special Cell) refers to the PCell of the MCG or the PSCell of the SCG, otherwise the term Special Cell refers to the PCell.

In the fifth generation wireless communication system, Physical Downlink Control Channel (PDCCH) is used to schedule DL transmissions on physical downlink shared channel (PDSCH) and UL transmissions on physical uplink shared channel (PUSCH), where the Downlink Control Information (DCI) on PDCCH includes: Downlink assignments containing at least modulation and coding format, resource allocation, and hybrid-automatic repeat request (HARQ) information related to DL-SCH; Uplink scheduling grants containing at least modulation and coding format, resource allocation, and HARQ information related to UL-SCH. In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the physical resource block(s) (PRB(s)) and orthogonal frequency-division multiplexing (OFDM) symbol(s) where the UE may assume no transmission is intended for the UE; Transmission of transmit power control (TPC) commands for physical uplink control channel (PUCCH) and PUSCH; Transmission of one or more TPC commands for SRS transmissions by one or more UEs; Switching a UE's active bandwidth part; Initiating a random access procedure. A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own demodulation reference signal (DMRS). Quadrature phase shift keying (QPSK) modulation is used for PDCCH.

In fifth generation wireless communication system, a list of search space configurations are signaled by GNB for each configured BWP wherein each search configuration is uniquely identified by an identifier. Identifier of search space configuration to be used for specific purpose such as paging reception, SI reception, random access response reception is explicitly signaled by gNB. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation below:

$$(y*(\text{number of slots in a radio frame})+x-\text{Monitoring-offset-PDCCH-slot}) \bmod (\text{Monitoring-periodicity-PDCCH-slot})=0;$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. Search space configuration includes the identifier of coreset configuration associated with it. A list of coreset configurations are signaled by GNB for each configured BWP wherein each coreset configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported SCS is pre-defined in NR. Each coreset configuration is associated with a list of Transmission configuration indicator (TCI) states. One DL RS ID (SSB or CSI RS) is configured per TCI state. The list of TCI states corresponding to a coreset configuration is signaled by gNB via RRC signaling. One of the TCI state in TCI state list is activated and indicated to UE by gNB. TCI state indicates the DL TX beam (DL TX beam is QCLed with SSB/CSI RS of TCI state) used by GNB for transmission of PDCCH in the PDCCH monitoring occasions of a search space.

In fifth generation wireless communication system bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP). BA is achieved by configuring RRC connected UE with BWP(s) and telling the UE which of the configured BWPs is currently the active one. When BA is configured, the UE only has to monitor PDCCH on the one active BWP i.e. it does not have to monitor PDCCH on the entire DL frequency of the serving cell. In RRC connected state, UE is configured with one or more DL and UL BWPs, for each configured Serving Cell (i.e. PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the media access control (MAC) entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

In the 5G wireless communication system, random access (RA) is supported. Random access (RA) is used to achieve uplink (UL) time synchronization. RA is used during initial access, handover, radio resource control (RRC) connection re-establishment procedure, scheduling request transmission, secondary cell group (SCG) addition/modification, beam failure recovery and data or control information transmission in UL by non-synchronized UE in RRC CONNECTED state. Several types of random access procedure is supported.

Contention based random access (CBRA): This is also referred as 4 step CBRA. In this type of random access, UE first transmits Random Access preamble (also referred as Msg1) and then waits for Random access response (RAR) in the RAR window. RAR is also referred as Msg2. Next generation node B (gNB) transmits the RAR on physical downlink shared channel (PDSCH). PDCCH scheduling the PDSCH carrying RAR is addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA preamble was detected by gNB. The RA-RNTI is calculated as follows: RA-RNTI=1+s_id+14*t_id+14*80*f_id+14*80*8*ul_carrier_id, where s_id is the index of the first orthogonal frequency division multiplexing (OFDM) symbol of the PRACH occasion where UE has transmitted Msg1, i.e. RA preamble; $0 \leq s\_id < 14$; t_id is the index of the first slot of the PRACH occasion ($0 \leq t\_id < 80$); fid is the index of the PRACH occasion within the slot in the frequency domain ($0 \leq f\_id < 8$), and ul_carrier_id is the UL carrier used for Msg1 transmission (0 for normal UL (NUL) carrier and 1 for supplementary UL (SUL) carrier. Several RARs for various Random access preambles detected by gNB can be multiplexed in the same RAR media access control (MAC) protocol data unit (PDU) by gNB. An RAR in MAC PDU corresponds to UE's RA preamble transmission if the RAR includes an RA preamble identifier (RAPID) of RA preamble transmitted by the UE. If the RAR corresponding to its RA preamble transmission is not received during the RAR window and UE has not yet transmitted the RA preamble for a configurable (configured by gNB in RACH configuration) number of times, the UE goes back to first step i.e. select random access resource (preamble/RACH occasion) and transmits the RA preamble. A backoff may be applied before going back to first step.

If the RAR corresponding to its RA preamble transmission is received the UE transmits message 3 (Msg3) in UL grant received in RAR. Msg3 includes message such as RRC connection request, RRC connection re-establishment request, RRC handover confirm, scheduling request, SI request etc. It may include the UE identity (i.e. cell-radio network temporary identifier (C-RNTI) or system architecture evolution (SAE)-temporary mobile subscriber identity (S-TMSI) or a random number). After transmitting the Msg3, UE starts a contention resolution timer. While the contention resolution timer is running, if UE receives a physical downlink control channel (PDCCH) addressed to C-RNTI included in Msg3, contention resolution is considered successful, contention resolution timer is stopped and RA procedure is completed. While the contention resolution timer is running, if UE receives contention resolution MAC control element (CE) including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and UE has not yet transmitted the RA preamble for a configurable number of times, UE goes back to first step i.e. select random access resource (preamble/RACH occasion) and transmits the RA preamble. A backoff may be applied before going back to first step.

Contention free random access (CFRA): This is also referred as legacy CFRA or 4 step CFRA. CFRA procedure is used for scenarios such as handover where low latency is required, timing advance establishment for secondary cell (Scell), etc. Evolved node B (eNB) assigns to UE dedicated Random access preamble. UE transmits the dedicated RA preamble. ENB transmits the RAR on PDSCH addressed to RA-RNTI. RAR conveys RA preamble identifier and timing alignment information. RAR may also include UL grant. RAR is transmitted in RAR window similar to contention based RA (CBRA) procedure. CFRA is considered successfully completed after receiving the RAR including RA preamble identifier (RAPID) of RA preamble transmitted by the UE. In case RA is initiated for beam failure recovery, CFRA is considered successfully completed if PDCCH addressed to C-RNTI is received in search space for beam failure recovery. If the RAR window expires and RA is not successfully completed and UE has not yet transmitted the RA preamble for a configurable (configured by gNB in RACH configuration) number of times, the UE retransmits the RA preamble.

For certain events such has handover and beam failure recovery if dedicated preamble(s) are assigned to UE, during first step of random access i.e. during random access resource selection for Msg1 transmission UE determines whether to transmit dedicated preamble or non dedicated preamble. Dedicated preambles are typically provided for a subset of SSBs/CSI RSs. If there is no SSB/CSI RS having DL reference signal received power (RSRP) above a threshold amongst the SSBs/CSI RSs for which contention free random access resources (i.e. dedicated preambles/ROs) are provided by gNB, UE select non dedicated preamble. Otherwise UE select dedicated preamble. So, during the RA procedure, one random access attempt can be CFRA while other random access attempt can be CBRA.

2 step contention based random access (2 step CBRA): In the first step, UE transmits random access preamble on PRACH and a payload (i.e. MAC PDU) on PUSCH. The random access preamble and payload transmission is also referred as MsgA. In the second step, after MsgA transmission, the UE monitors for a response from the network (i.e. gNB) within a configured window. The response is also referred as MsgB. If CCCH SDU was transmitted in MsgA payload, UE performs contention resolution using the contention resolution information in MsgB. The contention resolution is successful if the contention resolution identity received in MsgB matches first 48 bits of CCCH SDU transmitted in MsgA. If C-RNTI was transmitted in MsgA payload, the contention resolution is successful if UE receives PDCCH addressed to C-RNTI. If contention resolution is successful, random access procedure is considered successfully completed. Instead of contention resolution information corresponding to the transmitted MsgA, MsgB may include a fallback information corresponding to the random access preamble transmitted in MsgA. If the fallback information is received, UE transmits Msg3 and performs contention resolution using Msg4 as in CBRA procedure. If contention resolution is successful, random access procedure is considered successfully completed. If contention resolution fails upon fallback (i.e. upon transmitting Msg3), UE retransmits MsgA. If configured window in which UE monitor network response after transmitting MsgA expires and UE has not received MsgB including contention resolution information or fallback information as explained above, UE retransmits MsgA. If the random access procedure is not successfully completed even after transmitting the msgA configurable number of times, UE fallbacks to 4 step RACH procedure i.e. UE only transmits the PRACH preamble.

MsgA payload may include one or more of common control channel (CCCH) service data unit (SDU), dedicated control channel (DCCH) SDU, dedicated traffic channel (DTCH) SDU, buffer status report (BSR) MAC control element (CE), power headroom report (PHR) MAC CE, SSB information, C-RNTI MAC CE, or padding. MsgA may include UE ID (e.g. random ID, S-TMSI, C-RNTI, resume ID, etc.) along with preamble in first step. The UE ID may be included in the MAC PDU of the MsgA. UE ID such as C-RNTI may be carried in MAC CE wherein MAC CE is included in MAC PDU. Other UE IDs (such random ID, S-TMSI, C-RNTI, resume ID, etc.) may be carried in CCCH SDU. The UE ID can be one of random ID, S-TMSI, C-RNTI, resume ID, IMSI, idle mode ID, inactive mode ID, etc. The UE ID can be different in different scenarios in which UE performs the RA procedure. When UE performs RA after power on (before it is attached to the network), then UE ID is the random ID. When UE perform RA in IDLE state after it is attached to network, the UE ID is S-TMSI. If UE has an assigned C-RNTI (e.g. in connected state), the UE ID is C-RNTI. In case UE is in INACTIVE state, UE ID is resume ID. In addition to UE ID, some addition ctrl information can be sent in MsgA. The control information may be included in the MAC PDU of the MsgA. The control information may include one or more of connection request indication, connection resume request indication, SI request indication, buffer status indication, beam information (e.g. one or more DL TX beam ID(s) or SSB ID(s)), beam failure recovery indication/information, data indicator, cell/BS/TRP switching indication, connection re-establishment indication, reconfiguration complete or handover complete message, etc.

2 step contention free random access (2 step CFRA): In this case gNB assigns to UE dedicated Random access preamble (s) and PUSCH resource(s) for MsgA transmission. RO(s) to be used for preamble transmission may also be indicated. In the first step, UE transmits random access preamble on PRACH and a payload on PUSCH using the contention free random access resources (i.e. dedicated preamble/PUSCH resource/RO). In the second step, after MsgA transmission, the UE monitors for a response from the network (i.e. gNB) within a configured window. If UE receives PDCCH addressed to C-RNTI, random access procedure is considered successfully completed. If UE receives fallback information corresponding to its transmitted preamble, random access procedure is considered successfully completed.

For certain events such has handover and beam failure recovery if dedicated preamble(s) and PUSCH resource(s) are assigned to UE, during first step of random access i.e. during random access resource selection for MsgA transmission UE determines whether to transmit dedicated preamble or non dedicated preamble. Dedicated preambles are typically provided for a subset of SSBs/CSI RSs. If there is no SSB/CSI RS having DL RSRP above a threshold amongst the SSBs/CSI RSs for which contention free random access resources (i.e. dedicated preambles/ROs/PUSCH resources) are provided by gNB, UE select non dedicated preamble. Otherwise UE select dedicated preamble. So, during the RA procedure, one random access attempt can be 2 step CFRA while other random access attempt can be 2 step CBRA.

Upon initiation of random access procedure, UE first selects the carrier (SUL or NUL). If the carrier to use for the Random Access procedure is explicitly signaled by gNB, UE select the signaled carrier for performing Random Access procedure. If the carrier to use for the Random Access procedure is not explicitly signaled by gNB; and if the Serving Cell for the Random Access procedure is configured with supplementary uplink and if the RSRP of the downlink pathloss reference is less than rsrp-ThresholdSSB-SUL: UE select the SUL carrier for performing Random Access procedure. Otherwise, UE select the NUL carrier for performing Random Access procedure. Upon selecting the UL carrier, UE determines the UL and DL BWP for random access procedure as specified in section 5.15 of TS 38.321. UE then determines whether to perform 2 step or 4 step RACH for this random access procedure.

If this random access procedure is initiated by PDCCH order and if the ra-PreambleIndex explicitly provided by PDCCH is not 0b000000, UE selects 4 step RACH.

else if 2 step contention free random access resources are signaled by gNB for this random access procedure, UE selects 2 step RACH.

else if 4 step contention free random access resources are signaled by gNB for this random access procedure, UE selects 4 step RACH.

else if the UL BWP selected for this random access procedure is configured with only 2 step RACH resources, UE selects 2 step RACH.

else if the UL BWP selected for this random access procedure is configured with only 4 step RACH resources, UE selects 4 step RACH.

else if the UL BWP selected for this random access procedure is configured with both 2 step and 4 step RACH resources, if RSRP of the downlink pathloss reference is below a configured threshold, UE selects 4 step RACH. Otherwise UE selects 2 step RACH.

In the fifth generation wireless communication system, node B (gNB) or base station in cell broadcast Synchronization Signal and PBCH block (SSB) consists of primary and secondary synchronization signals (PSS, SSS) and system information. System information includes common parameters needed to communicate in cell. In the fifth generation wireless communication system (also referred as next generation radio or NR), System Information (SI) is divided into the MIB and a number of system information blocks (SIBs) where:

the MIB is always transmitted on the BCH with a periodicity of 80 ms and repetitions made within 80 ms and it includes parameters that are needed to acquire SIB1 from the cell.

the SIB1 is transmitted on the DL-SCH with a periodicity of 160 ms and variable transmission repetition. The default transmission repetition periodicity of SIB1 is 20 ms but the actual transmission repetition periodicity is up to network implementation. The scheduling information in SIB 1 includes mapping between SIBs and SI messages, periodicity of each SI message and SI window length. The scheduling information in SIB 1 includes an indicator for each SI message, which indicates whether the concerned SI message is being broadcasted or not. If at least one SI message is not being broadcasted, SIB1 may include random access resources (PRACH preamble(s) and PRACH resource(s)) for requesting gNB to broadcast one or more SI message(s).

SIBs other than SIB1 are carried in SystemInformation (SI) messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with a SI-window and the SI-windows of different SI messages do not overlap. That is, within one SI-window only the corresponding SI message is transmitted. Any SIB except SIB1 can be configured to be cell specific or area specific, using an indication in SIB1. The cell specific SIB is applicable only within a cell that provides the SIB while the area specific SIB is applicable within an area referred to as SI area, which consists of one or several cells and is identified by systemInformation-AreaID.

In the fifth generation wireless communication system, RRC can be in one of the following states: RRC_IDLE, RRC_INACTIVE, and RRC_CONNECTED. A UE is either in RRC_CONNECTED state or in RRC_INACTIVE state when an RRC connection has been established. If this is not the case, i.e. no RRC connection is established, the UE is in RRC_IDLE state. The RRC states can further be characterized as follows:

In the RRC_IDLE, a UE specific DRX may be configured by upper layers. The UE monitors short Messages transmitted with P-RNTI over DCI; monitors a Paging channel for CN paging using 5G-S-TMSI; performs neighboring cell measurements and cell (re-)selection; acquires system information and can send SI request (if configured); performs logging of available measurements together with location and time for logged measurement configured UEs.

In RRC_INACTIVE, a UE specific DRX may be configured by upper layers or by RRC layer; UE stores the UE Inactive AS context; a RAN-based notification area is configured by RRC layer. The UE monitors Short Messages transmitted with P-RNTI over DCI; monitors a Paging channel for CN paging using 5G-S-TMSI and RAN paging using full inactive RNTI (I-RNTI); performs neighboring cell measurements and cell (re-)selection; performs RAN-based notification area updates periodically and when moving outside the configured RAN-based notification area; acquires system information and can send SI request (if configured); performs logging of available measurements together with location and time for logged measurement configured UEs.

In the RRC_CONNECTED, the UE stores the AS context and transfer of unicast data to/from UE takes place. The UE monitors Short Messages transmitted with P-RNTI over DCI, if configured; monitors control channels associated with the shared data channel to determine if data is scheduled for it; provides channel quality and feedback information; performs neighboring cell measurements and measurement reporting; acquires system information.

In the RRC_CONNECTED, network may initiate suspension of the RRC connection by sending RRCRelease with suspend configuration. When the RRC connection is suspended, the UE stores the UE Inactive AS context and any configuration received from the network, and transits to RRC_INACTIVE state. If the UE is configured with SCG, the UE releases the SCG configuration upon initiating a RRC Connection Resume procedure. The RRC message to suspend the RRC connection is integrity protected and ciphered.

The resumption of a suspended RRC connection is initiated by upper layers when the UE needs to transit from RRC_INACTIVE state to RRC_CONNECTED state or by RRC layer to perform an RNA update or by RAN paging from NG-RAN. When the RRC connection is resumed, network configures the UE according to the RRC connection resume procedure based on the stored UE Inactive AS context and any RRC configuration received from the network. The RRC connection resume procedure re-activates AS security and re-establishes signaling radio bearer(s) (SRB(s)) and data radio bearer(s) (DRB(s)). In response to a request to resume the RRC connection, the network may resume the suspended RRC connection and send UE to RRC_CONNECTED, or reject the request to resume and send UE to RRC_INACTIVE (with a wait timer), or directly re-suspend the RRC connection and send UE to RRC_INACTIVE, or directly release the RRC connection and send UE to RRC_IDLE, or instruct the UE to initiate non-access stratum (NAS) level recovery (in this case the network sends an RRC setup message).

Upon initiating the resume procedure, UE:
apply the default L1 parameter values as specified in corresponding physical layer specifications, except for the parameters for which values are provided in SIB1;
apply the default MAC Cell Group configuration
apply the CCCH configuration
start timer T319;
apply the timeAlignmentTimerCommon included in SIB1
apply the default SRB1 configuration
set the variable pendingRNA-Update to false;
initiate transmission of the RRCResumeRequest message or RRCResumeRequest1
restore the RRC configuration, RoHC state, the stored quality of service (QoS) flow to DRB mapping rules and the KgNB and KRRCint keys from the stored UE Inactive AS context except for the following:
  masterCellGroup;
  mrdc-SecondaryCellGroup, if stored; and
  pdcp-Config;
set the resumeMAC-I to the 16 least significant bits of the MAC-I calculated:
  2> over the ASN.1 encoded as per clause 8 (i.e., a multiple of 8 bits) VarResumeMAC-Input;
  2> with the KRRCint key in the UE Inactive AS Context and the previously configured integrity protection algorithm; and
  2> with all input bits for COUNT, BEARER and DIRECTION set to binary ones;
derive the KgNB key based on the current KgNB key or the NH, using the stored nextHopChainingCount value;
derive the KRRCenc key, the KRRCint key, the KUPint key and the KUPenc key;
configure lower layers to apply integrity protection for all signaling radio bearers except SRB0 using the configured algorithm and the KRRCint key and KUPint key, i.e., integrity protection shall be applied to all subsequent messages received and sent by the UE;
configure lower layers to apply ciphering for all signaling radio bearers except SRB0 and to apply the configured ciphering algorithm, the KRRCenc key and the KUPenc key derived in this subclause, i.e. the ciphering configuration shall be applied to all subsequent messages received and sent by the UE;

re-establish PDCP entities for SRB1;

resume SRB1;

transmit RRCResumeRequest or RRCResumeRequest1.

In the fifth generation wireless communication system mobile originated Small Data Transmission (SDT) procedure is also supported in RRC_INACTIVE. It is a procedure allowing data transmission while remaining in RRC_INACTIVE (i.e. without transitioning to RRC_CONNECTED state). SDT is enabled on a radio bearer basis and is initiated by the UE only if less than a configured amount of UL data awaits transmission across all radio bearers for which SDT is enabled, the DL RSRP is above a configured threshold, and a valid SDT resource is available.

SDT procedure is initiated with either a transmission over RACH (configured via system information) or over Type 1 CG resources (configured via dedicated signaling in RRCRelease). The SDT resources can be configured on initial BWP for both RACH and CG. RACH and CG resources for SDT can be configured on either or both of NUL and SUL carriers. For RACH, the network configures 2-step and/or 4-step RA resources for SDT. When both 2-step and 4-step RA resources for SDT are configured, the UE selects the RA type based on DL RSRP. CFRA is not supported for SDT over RACH.

Once initiated, the SDT procedure is terminated successfully after the UE is directed to RRC_IDLE or RRC_INACTIVE (via RRCRelease) or to RRC_CONNECTED (via RRCResume), or unsuccessfully upon cell re-selection, expiry of the SDT failure detection timer, or an RLC entity reaching a configured maximum retransmission threshold. Upon failure of the SDT procedure, the UE transitions to RRC_IDLE.

After the initial PUSCH transmission during the SDT procedure, subsequent transmissions are handled differently depending on the type of resource used to initiate the SDT procedure:

When using CG resources, the network can schedule subsequent UL transmissions using dynamic grants or they can take place on the following CG resource occasions. The DL transmissions are scheduled using dynamic assignments. The UE can initiate subsequent UL transmission only after reception of confirmation for the initial PUSCH transmission from the network.

When using RACH resources, the network can schedule subsequent UL and DL transmissions using dynamic UL grants and DL assignments, respectively, after the completion of the RA procedure.

SDT procedure over CG resources can only be initiated with valid UL timing alignment. The UL timing alignment is maintained by the UE based on network configured timing alignment timer and DL RSRP of configured number of highest ranked SSBs. Upon expiry of the timing alignment timer, the CG resources are released. Logical channel restrictions can be configured by the network for radio bearers enabled for SDT and are applied by the UE regardless of whether the SDT procedure is initiated with either a transmission over RACH or over Type 1 CG resources.

Mobile terminated small data transmission (MT-SDT) i.e., DL-triggered small data is not yet supported in fifth generation wireless communication system. MT-SDT can allows similar benefits as MO-SDT, i.e. 1) reducing signaling overhead and UE power consumption by not transitioning to RRC_CONNECTED and reducing latency by allowing fast transmission of (small and infrequent) packets.

Mobile terminated early data transmission (MT-EDT) procedure is supported in fourth generation (4G) system. MT-EDT is intended for a single downlink data transmission during the random access procedure. MT-EDT is initiated by the MME if the UE and the network support MT-EDT and there is a single DL data transmission for the UE. If the data can fit in one single downlink transmission the eNB includes mt-EDT indication in the Paging message including S-TMSI (i.e. core network (CN) paging) for the UE. Upon receiving MT-EDT indication, UE initiates MO-EDT (or MO-SDT) procedure, wherein UL data is not included in Msg3 and DL data is included in Msg4 together with RRCConnectionRelease.

Unlike 4G system, MT-SDT in 5G is to be supported in RRC_INACTIVE state. 5G network architecture is different with different nodes compared to 4G. In 5G multiple downlink transmission(s) are possible during SDT procedure unlike 4G where only one single DL transmission is allowed. So, MT-EDT procedure for triggering MT-SDT cannot be used in 5G system. New MT-SDT triggering mechanism and MT-SDT procedure is needed for initial DL data reception and subsequent UL/DL data transmissions in RRC_INACTIVE.

UE is in RRC_CONNECTED state. UE indicates its capability to support MT-SDT via dedicated RRC message (e.g. UE capability information message or any other dedicated RRC message) to gNB. UE may send UE capability information message to gNB in response to UE capability request from gNB. gNB provides the UE's capabilities to an access and mobility management function (AMF) wherein the AMF stores these capabilities. gNB can also receive UE's capability to support MT-SDT in Core Network assistance information message from AMF, if AMF has the stored capabilities.

In the RRC_CONNECTED, gNB initiate suspension of the RRC connection by sending RRCRelease with suspend configuration. When the RRC connection is suspended, the UE stores the UE AS context and any configuration received from the gNB, and transits to RRC_INACTIVE state. In the RRC_INACTIVE state, UE's AS context is kept at the last serving gNB node. In the RRC_INACTIVE state, the UE-associated NG-C connection is maintained between last serving gNB and the serving AMF. In the RRC_INACTIVE state, the UE-associated NG-U connection is maintained between last serving gNB and serving user plane function (UPF). Serving AMF and serving UPF are the AMF and UPF with which the NG-C connection and NG-U connection are established respectively for UE in RRC_CONNECTED.

While the UE is in RRC_INACTIVE state, DL data arrives for the UE at last serving gNB from UPF or DL UE-associated signaling (except the UE Context Release Command message) arrives for UE at the last serving gNB from the AMF. Upon arrival of the DL data or DL UE-associated signalling, last serving gNB triggers RAN paging. There are two cases of RAN paging:

Case 1: RAN paging is via one or more cell(s) of last serving gNB

Case 2: RAN paging is via cell(s) of other gNB (s) in RAN Notification Area (RNA) of UE The detailed operation for case 1 i.e. RAN paging via one or more cell(s) of last serving gNB is as follows:

FIG. 1 illustrates a RAN paging via one or more cells of the last serving gNB according to an embodiment of the disclosure.

Referring to FIG. 1, in operation S100, a gNB (e.g., last serving gNB of RRC_INACTIVE UE) may receive DL data for the RRC_INACTIVE UE from a UPF.

In operation S105, the gNB may receive DL UE-associated signalling (except the UE Context Release Command message, paging message) for RRC_INACTIVE UE from an AMF.

In operation S110, the gNB may determine if volume of DL data and/or DL UE-associated signaling is less than a data volume threshold (or gNB may determine if DL data/signaling is for radio bearer (s) configured for SDT (or MT-SDT) and total volume of DL data and/or signaling for radio bearer (s) configured for SDT (or MT-SDT) is less than a data volume threshold; here it is assumed that DL data/signaling is not available for radio bearer(s) not configured for SDT or MT-SDT). Alternatively, the gNB may determine if volume of DL data and/or DL UE-associated signaling is equal to or less than a data volume threshold (or gNB may determine if DL data/signaling is for radio bearer (s) configured for SDT (or MT-SDT) and total volume of DL data and/or signaling for radio bearer (s) configured for SDT (or MT-SDT) is equal to or less than a data volume threshold; here it is assumed that DL data/signaling is not available for radio bearer(s) not configured for SDT or MT-SDT). The data volume threshold can be pre-defined or can be configured by O&M function in the network or can be signaled by AMF to gNB; volume can be in bits or bytes.

If volume of DL data and/or DL UE-associated signaling is less than the data volume threshold or if volume of DL data and/or DL UE-associated signaling is equal to or less than the data volume threshold (or if DL data/signaling is for radio bearer (s) configured for SDT (or MT-SDT) and total volume of DL data and/or signaling for radio bearer (s) configured for SDT (or MT-SDT) is less than (or equal to or less than) a data volume threshold; here it is assumed that DL data/signaling is not available for radio bearer(s) not configured for SDT or MT-SDT), the gNB may transmit, in operation S115, a PDCCH addressed to P-RNTI in a PO of the UE wherein the scheduling information for paging message is included in DCI of the PDCCH. The gNB may transmit, in operation S120, the paging message on PDSCH as per the scheduling information included in DCI. The UE may be paged with I-RNTI (e.g. full I-RNTI) and an SDT indication (or MT-SDT indication) may be included in the paging message. The I-RNTI of the UE may be included in the paging message. MT-SDT indication may be also included in the paging message for the UE. A paging record is included in the paging message where the paging record includes the I-RNTI and MT-SDT indication. Paging record is included in list of paging records wherein list is common for UEs with MT-SDT indication and for UEs without MT-SDT indication. In an embodiment instead of MT SDT indication, a list of paging records for MT-SDT can be included and this list includes paging record for the UE wherein paging record includes the I-RNTI of UE. Note that this list of paging records for MT-SDT is different from list of paging records in existing system used for paging not intended for MT-SDT.

If volume of DL data and/or DL UE-associated signaling is larger than the data volume threshold or if volume of DL data and/or DL UE-associated signaling is equal to or larger than the data volume threshold (or if DL data/signaling is available for radio bearer(s) not configured for SDT; or if DL data/signaling is for radio bearer (s) configured for SDT (or MT-SDT) and total volume of DL data and/or signaling for radio bearer (s) configured for SDT (or MT-SDT) is larger than (or equal to or larger than) a data volume threshold), the gNB may transmit, in operation S125, a PDCCH addressed to P-RNTI in a PO of the UE wherein the scheduling information for paging message is included in DCI of the PDCCH. The gNB may transmit, in operation S130, the paging message on PDSCH as per the scheduling information included in DCI. The UE may be paged with I-RNTI (e.g. full I-RNTI) and an SDT indication (or MT-SDT indication) may not be included in the paging message. The I-RNTI of the UE may be included in the paging message. MT-SDT indication may not be included in the paging message for the UE. A paging record is included in the paging message where the paging record includes the I-RNTI and the MT-SDT indication may not be included in the paging record. Paging record is included in list of paging records wherein list is common for UEs with MT-SDT indication and for UEs without MT-SDT indication. In an embodiment wherein the list of paging records in paging message are different for MT-SDT and non MT-SDT, paging record for UE including UE's I-RNTI is included in list of paging records not intended for MT-SDT.

In one example, last serving gNB performs the following operation when the DL data arrives for the RRC_INACTIVE UE at last serving gNB from UPF and/or DL UE-associated signaling (except the UE Context Release Command message, paging message) arrives for RRC_INACTIVE UE at the last serving gNB from the AMF:

If volume of DL data for UE<data volume threshold (or if DL data for UE is for radio bearer (s) configured for SDT (or MT-SDT) and total volume of DL data for radio bearer (s) configured for SDT (or MT-SDT) is less than a data volume threshold; here it is assumed that DL data/signaling is not available for radio bearer(s) not configured for SDT or MT-SDT) (note that "DL data" refers to data and/or signaling received from UPF and AMF respectively; DL data can consists of multiple packets/PDUs; data volume threshold can be pre-defined or can be configured by O&M function in the network or can be signaled by AMF to gNB; volume can be in bits or bytes):

(Alternate) If volume of DL data for UE<=data volume threshold (or if DL data for UE is for radio bearer (s) configured for SDT (or MT-SDT) and total volume of DL data for radio bearer (s) configured for SDT (or MT-SDT) is less than or equal to a data volume threshold; here it is assumed that DL data/signaling is not available for radio bearer(s) not configured for SDT or MT-SDT) (note that "DL data" refers to data and/or signaling received from UPF and AMF respectively; DL data can consists of multiple packets/PDUs; data volume threshold can be pre-defined or can be configured by O&M function in the network or can be signaled by AMF to gNB):

(Alternate) If UE supports MT-SDT and gNB supports MT-SDT (or the cell(s) via which RAN paging is transmitted supports MT-SDT) and If volume of DL data for UE<data volume threshold (or if DL data for UE is for radio bearer (s) configured for SDT (or MT-SDT) and total volume of DL data for radio bearer (s) configured for SDT (or MT-SDT) is less than a data volume threshold; here it is assumed that DL data/signaling is not available for radio bearer(s) not configured for SDT or MT-SDT) (note that "DL data" refers to data and/or signaling received from UPF and AMF respectively; DL data can consists of multiple packets/PDUs; data volume threshold can be pre-defined or can be configured by O&M function in the network or can be signaled by AMF to gNB):

(Alternate) If UE supports MT-SDT and gNB supports MT-SDT (or the cell(s) via which RAN paging is transmitted supports MT-SDT) and If volume of DL data for UE<=data volume threshold (or if DL data for UE is for radio bearer (s) configured for SDT (or MT-SDT) and total volume of DL data for radio bearer (s) configured for SDT (or MT-SDT) is less than or equal to a data volume threshold; here it is assumed that DL data/signaling is not available for radio bearer(s) not configured for SDT or MT-SDT) (note that "DL data" refers to data and/or signaling received from UPF and AMF respectively; DL data can consists of multiple packets/PDUs; data volume threshold can be pre-defined or can be configured by O&M function in the network or can be signaled by AMF to gNB):

UE is paged with I-RNTI (e.g. full I-RNTI) and SDT indication is included for the UE in paging message. gNB generates paging message wherein the I-RNTI of UE is included in the paging message. MT-SDT indication is also included in the paging message for the UE. A paging record is included in the paging message where the paging record includes I-RNTI and MT-SDT indication. Paging record is included in list of paging records wherein list is common for UEs with MT-SDT indication and for UEs without MT-SDT indication. In an embodiment instead of MT SDT indication, a list of paging records for MT-SDT can be included and this list includes paging record for the UE wherein paging record includes the I-RNTI of UE. Note that this list of paging records for MT-SDT is different from list of paging records in existing system used for paging not intended for MT-SDT. gNB transmits PDCCH addressed to P-RNTI in the PO of UE wherein the scheduling information for paging message is included in the DCI of PDCCH. Paging message is transmitted on PDSCH. gNB transmits the paging message on PDSCH as per the scheduling information included in DCI. gNB may also transmit early paging indication before the UE's PO wherein the early paging indication indicates that there is paging for the UE or for the UE's paging subgroup. UE may belong to a paging subgroup wherein the paging sub group is assigned by core network or determined by UE based on UE identity.

Else (i.e. If volume of DL data for UE is larger than the data volume threshold or if volume of DL data for UE is equal to or larger than the data volume threshold (or if DL data for UE is available for radio bearer(s) not configured for SDT; or if DL data is for radio bearer (s) configured for SDT (or MT-SDT) and total volume of DL data of UE for radio bearer (s) configured for SDT (or MT-SDT) is larger than (or equal to or larger than) a data volume threshold) (note that "DL data" refers to data and/or signaling received from UPF and AMF respectively; DL data can consists of multiple packets/PDUs; data volume threshold can be pre-defined or can be configured by O&M function in the network or can be signaled by AMF to gNB)

UE is paged with I-RNTI (e.g. full I-RNTI). SDT indication is not included for the UE in paging message. gNB generates paging message wherein the I-RNTI of UE is included in the paging message. MT-SDT indication is not included in the paging message for the UE. A paging record is included in the paging message where the paging record includes I-RNTI and MT-SDT indication is not included in the paging record. Paging record is included in list of paging records wherein list is common for UEs with MT-SDT indication and for UEs without MT-SDT indication. In an embodiment wherein the list of paging records in paging message are different for MT-SDT and non MT-SDT, paging record for UE including UE's I-RNTI is included in list of paging records not intended for MT-SDT. gNB transmits PDCCH addressed to P-RNTI in the PO of UE wherein the scheduling information for paging message is included in the DCI of PDCCH. gNB transmits the paging message on PDSCH as per the scheduling information included in DCI. gNB may also transmit early paging indication before the UE's PO wherein the early paging indication indicates that there is paging for the UE or for the UE's paging subgroup. UE may belong to a paging subgroup wherein the paging sub group is assigned by core network or determined by UE based on UE identity.

In one example, last serving gNB performs the following operation when the DL data arrives for the RRC_INACTIVE UE at last serving gNB from UPF and/or DL UE-associated signaling (except the UE Context Release Command message, paging message) arrives for RRC_INACTIVE UE at the last serving gNB from the AMF:

If volume of DL data received from UPF for UE<data volume threshold (or if DL data for UE received from UPF is for radio bearer (s) configured for SDT (or MT-SDT) and total volume of DL data for radio bearer (s) configured for SDT (or MT-SDT) is less than a data volume threshold; here it is assumed that DL data/signaling is not available for radio bearer(s) not configured for SDT or MT-SDT) (note that "DL data" refers to data and/or signaling received from UPF and AMF respectively; DL data can consists of multiple packets/PDUs; data volume threshold can be pre-defined or can be configured by O&M function in the network or can be signaled by AMF to gNB; volume can be in bits or bytes):

(Alternate) If volume of DL data received from UPF for UE<=data volume threshold (or if DL data for UE received from UPF is for radio bearer (s) configured for SDT (or MT-SDT) and total volume of DL data for radio bearer (s) configured for SDT (or MT-SDT) is less than or equal to a data volume threshold; here it is assumed that DL data/signaling is not available for radio bearer(s) not configured for SDT or MT-SDT) (note that "DL data" refers to data and/or signaling received from UPF and AMF respectively; DL data can consists of multiple packets/PDUs; data volume threshold can be pre-defined or can be configured by O&M function in the network or can be signaled by AMF to gNB):

(Alternate) If UE supports MT-SDT and gNB supports MT-SDT (or the cell(s) via which RAN paging is transmitted supports MT-SDT) and If volume of DL data received from UPF for UE<data volume threshold (or If UE supports MT-SDT and gNB supports MT-SDT (or the cell(s) via which RAN paging is transmitted supports MT-SDT) and if DL data for UE received from UPF is for radio bearer (s) configured for SDT (or MT-SDT) and total volume of DL data for radio bearer (s) configured for SDT (or MT-SDT) is less than a data volume threshold; here it is assumed that DL data/signaling is not available for radio bearer(s) not configured for SDT or MT-SDT) (note that "DL data" refers to data and/or signaling received from UPF and AMF respectively; DL data can consists of multiple packets/PDUs; data volume threshold can be pre-defined or can be configured by O&M function in the network or can be signaled by AMF to gNB):

(Alternate) If UE supports MT-SDT and gNB supports MT-SDT (or the cell(s) via which RAN paging is transmitted supports MT-SDT) and If volume of DL data received from UPF for UE<=data volume threshold (or If UE supports MT-SDT and gNB supports MT-SDT (or the cell(s) via which RAN paging is transmitted supports MT-SDT) and if DL data for UE received from UPF is for radio bearer (s) configured for SDT (or MT-SDT) and total volume of DL data for radio bearer (s) configured for SDT (or MT-SDT) is less than or equal to a data volume threshold; here it is assumed that DL data/signaling is not available for radio bearer(s) not configured for SDT or MT-SDT) (note that "DL data" refers to data and/or signaling received from UPF and AMF respectively; DL data can consists of multiple packets/PDUs; data volume threshold can be pre-defined or can be configured by O&M function in the network or can be signaled by AMF to gNB):

UE is paged with I-RNTI (e.g. full I-RNTI) and SDT indication is included for the UE in paging message. gNB generates paging message wherein the I-RNTI of UE is included in the paging message. MT-SDT indication is also included in the paging message for the UE. A paging record is included in the paging message where the paging record includes I-RNTI and MT-SDT indication. Paging record is included in list of paging records wherein list is common for UEs with MT-SDT indication and for UEs without MT-SDT indication. In an embodiment instead of MT SDT indication, a list of paging records for MT-SDT can be included and this list includes paging record for the UE wherein paging record includes the I-RNTI of UE. Note that this list of paging records for MT-SDT is different from list of paging records in existing system used for paging not intended for MT-SDT. gNB transmits PDCCH addressed to P-RNTI in the PO of UE wherein the scheduling information for paging message is included in the DCI of PDCCH. gNB transmits the paging message on PDSCH as per the scheduling information included in DCI. gNB may also transmit early paging indication before the UE's PO wherein the early paging indication indicates that there is paging for the UE or for the UE's paging subgroup. UE may belong to a paging subgroup wherein the paging sub group is assigned by core network or determined by UE based on UE identity.

Else if specific signaling message(s) for UE (or if specific signaling message(s) for radio bearer configured for SDT (or MT-SDT)) are received from AMF (specific signaling message can be pre-defined signaling message or any signaling message except paging message, UE Context Release Command message)

UE is paged with I-RNTI (e.g. full I-RNTI) and SDT indication is included for the UE in paging message. gNB generates paging message wherein the I-RNTI of UE is included in the paging message. MT-SDT indication is also included in the paging message for the UE. A paging record is included in the paging message where the paging record includes I-RNTI and MT-SDT indication. gNB transmits PDCCH addressed to P-RNTI in the PO of UE wherein the scheduling information for paging message is included in the DCI of PDCCH. gNB transmits the paging message on PDSCH as per the scheduling information included in DCI. gNB may also transmit early paging indication before the UE's PO wherein the early paging indication indicates that there is paging for the UE or for the UE's paging subgroup. UE may belong to a paging subgroup wherein the paging sub group is assigned by core network or determined by UE based on UE identity.

Else

UE is paged with I-RNTI (e.g. full I-RNTI). SDT indication is not included for the UE in paging message. gNB generates paging message wherein the I-RNTI of UE is included in the paging message. MT-SDT indication is not included in the paging message for the UE. A paging record is included in the paging message where the paging record includes I-RNTI and does not include MT-SDT indication. Paging record is included in list of paging records wherein list is common for UEs with MT-SDT indication and for UEs without MT-SDT indication. In an embodiment wherein the list of paging records in paging message are different for MT-SDT and non MT-SDT, paging record for UE including UE's I-RNTI is included in list of paging records not intended for MT-SDT. gNB transmits PDCCH addressed to P-RNTI in the PO of UE wherein the scheduling information for paging message is included in the DCI of PDCCH. gNB transmits the paging message on PDSCH as per the scheduling information included in DCI. gNB may also transmit early paging indication before the UE's PO wherein the early paging indication indicates that there is paging for the UE or for the UE's paging subgroup. UE may belong to a paging subgroup wherein the paging sub group is assigned by core network or determined by UE based on UE identity.

An example of the structure for paging message according to the disclosure is as shown Table 1 below. The paging record for a UE may or may not include MT-SDT indication if the ue-Identity in the paging record is set to full-RNTI (i.e. full I-RNTI) depending on condition specified earlier. The paging record for a UE does not include MT-SDT indication if the ue-Identity in the paging record is set to ng-5G-S-TMSI.

TABLE 1

| Paging message |
| --- |
| -- ASN1START |
| -- TAG-PAGING-START |
| Paging ::=    SEQUENCE { |
|    pagingRecordList    PagingRecordList    OPTIONAL, -- Need N |

TABLE 1-continued

| Paging message | | |
|---|---|---|
| lateNonCriticalExtension | OCTET STRING | OPTIONAL, |
| nonCriticalExtension | SEQUENCE{ } | OPTIONAL |

```
}
PagingRecordList ::=            SEQUENCE (SIZE(1..maxNrofPageRec)) OF PagingRecord
PagingRecord ::=                SEQUENCE {
   ue-Identity                  PagingUE-Identity,
   accessType                      ENUMERATED {non3GPP}   OPTIONAL, -- Need N
   ...
   [[
   mt-SDT-r17                   ENUMERATED {TRUE} OPTIONAL,
   ]]
}
PagingUE-Identity ::=           CHOICE {
   ng-5G-S-TMSI                    NG-5G-S-TMSI,
   fullI-RNTI                      I-RNTI-Value,
   ...
}
-- TAG-PAGING-STOP
-- ASN1STOP
```

Figure 2:
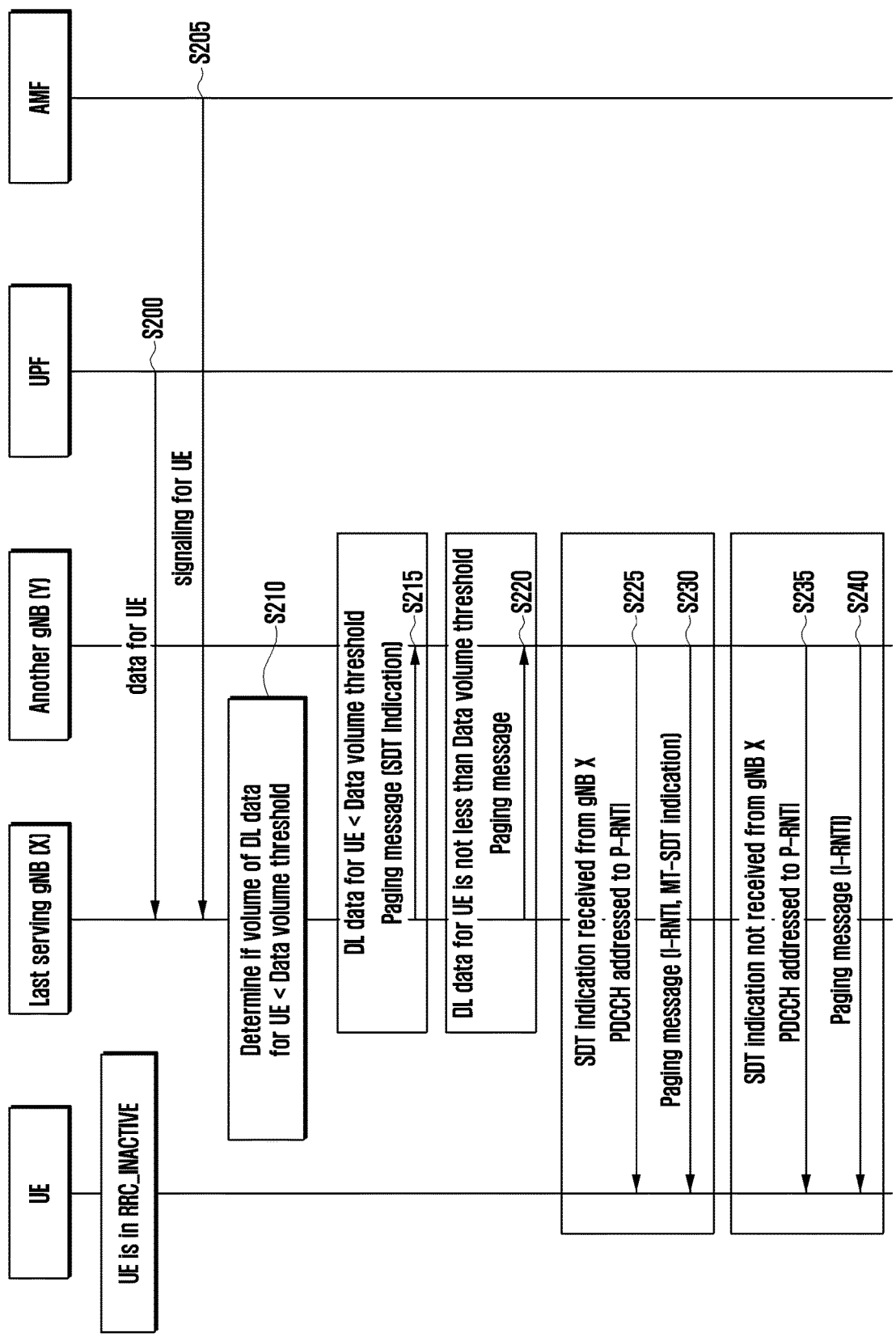
FIG. 2 illustrates a RAN paging via one or more cells of another gNB according to an embodiment of the disclosure.

The detailed operation for case 2 i.e. RAN paging via one or more cell(s) of gNB other than the last serving gNB is as follows:

FIG. 2 illustrates a RAN paging via one or more cells of another gNB according to an embodiment of the disclosure.

Referring to FIG. 2, in operation S200, a gNB (gNB X, e.g., last serving gNB of RRC_INACTIVE UE) may receive DL data for the RRC_INACTIVE UE from a UPF.

In operation S205, the gNB may receive DL UE-associated signaling (except the UE Context Release Command message, paging message) for RRC_INACTIVE UE from an AMF.

In operation S210, the gNB may determine if volume of DL data and/or DL UE-associated signaling is less than a data volume threshold (or gNB may determine if DL data/signaling is for radio bearer (s) configured for SDT (or MT-SDT) and total volume of DL data and/or signaling for radio bearer (s) configured for SDT (or MT-SDT) is less than a data volume threshold; here it is assumed that DL data/signaling is not available for radio bearer(s) not configured for SDT or MT-SDT). Alternatively, the gNB may determine if volume of DL data and/or DL UE-associated signaling is equal to or less than a data volume threshold (or gNB may determine if DL data/signaling is for radio bearer (s) configured for SDT (or MT-SDT) and total volume of DL data and/or signaling for radio bearer (s) configured for SDT (or MT-SDT) is less than or equal to a data volume threshold; here it is assumed that DL data/signaling is not available for radio bearer(s) not configured for SDT or MT-SDT). The data volume threshold can be pre-defined or can be configured by O&M function in the network or can be signaled by AMF to gNB; volume can be in bits or bytes.

If volume of DL data and/or DL UE-associated signaling is less than the data volume threshold or if volume of DL data and/or DL UE-associated signaling is equal to or less than the data volume threshold (or if DL data/signaling is for radio bearer (s) configured for SDT (or MT-SDT) and total volume of DL data and/or signaling for radio bearer (s) configured for SDT (or MT-SDT) is less than (or equal to or less than) a data volume threshold; here it is assumed that DL data/signaling is not available for radio bearer(s) not configured for SDT), the gNB may send, in operation S215, to another gNB (gNB Y) in the same RAN notification area (RNA) a paging message on an Xn interface. The paging message may include paging information which comprises at least one of -RNTI, UE index (i.e. 5G-S-TMSI mod 1024 or 5G-S-TMSI mod P where P is one of 1024, 2048, 4096 etc.), UE's DRX cycle received from AMF, or UE's RAN DRX cycle configured in RRC Release message. The paging message may also include an SDT indication. The SDT indication may be included in the paging information.

If volume of DL data and/or DL UE-associated signaling is larger than the data volume threshold or if volume of DL data and/or DL UE-associated signaling is equal to or larger than the data volume threshold (or if DL data/signaling is available for radio bearer(s) not configured for SDT; or if DL data/signaling is for radio bearer (s) configured for SDT (or MT-SDT) and total volume of DL data and/or signaling for radio bearer (s) configured for SDT (or MT-SDT) is equal to larger than a data volume threshold), the gNB may send, in operation S220, to another gNB (gNB Y) in the same RNA a paging message on an Xn interface. The paging message may include paging information which comprises at least one of -RNTI, UE index (i.e. 5G-S-TMSI mod 1024 or 5G-S-TMSI mod P where P is one of 1024, 2048, 4096 etc.), UE's DRX cycle received from AMF, or UE's RAN DRX cycle configured in RRC Release message. The paging message may not include an SDT indication.

If the SDT indication is received from the gNB X, the gNB Y may transmit, in operation S225, a PDCCH addressed to P-RNTI in a PO of the UE wherein the scheduling information for paging message is included in DCI of the PDCCH. The gNB Y may transmit, in operation S230, the paging message on PDSCH as per the scheduling information included in DCI. The UE may be paged with I-RNTI (e.g. full I-RNTI) and an SDT indication (or MT-SDT indication) may be included in the paging message. The I-RNTI of the UE may be included in the paging message. MT-SDT indication may be also included in the paging message for the UE. A paging record is included in the paging message where the paging record includes the I-RNTI and MT-SDT indication. Paging record is included in list of paging records wherein list is common for UEs with MT-SDT indication and for UEs without MT-SDT indication. In an embodiment instead of MT SDT indication, a list of paging records for MT-SDT can be included and this list includes paging record for the UE wherein paging record includes the I-RNTI of UE. Note that this list of paging records for MT-SDT is different from list of paging records in existing system used for paging not intended for MT-SDT.

If the SDT indication is not received from the gNB X, the gNB Y may transmit, in operation S235, a PDCCH addressed to P-RNTI in a PO of the UE wherein the scheduling information for paging message is included in DCI of the PDCCH. The gNB Y may transmit, in operation S240, the paging message on PDSCH as per the scheduling information included in DCI. The UE may be paged with I-RNTI (e.g. full I-RNTI) and an SDT indication (or MT-SDT indication) may not be included in the paging message. The I-RNTI of the UE may be included in the paging message. MT-SDT indication may not be included in the paging message for the UE. A paging record is included in the paging message where the paging record includes the I-RNTI and MT-SDT indication may not be included in the paging record. Paging record is included in list of paging records wherein list is common for UEs with MT-SDT indication and for UEs without MT-SDT indication. In an embodiment wherein the list of paging records in paging message are different for MT-SDT and non MT-SDT, paging record for UE including UE's I-RNTI is included in list of paging records not intended for MT-SDT.

In one example, last serving gNB (say gNB X) sends paging message via Xn interface to another gNB (say gNB Y) in RAN Notification Area (RNA) of UE.

Paging information like I-RNTI, UE index (i.e. 5G-S-TMSI mod 1024 or 5G-S-TMSI mod P where P is one of 1024, 2048, 4096 etc.), UE's DRX cycle received from AMF, UE's RAN DRX cycle configured in RRC Release message etc. is included in paging message sent on Xn.

If volume of DL data for UE<data volume threshold (or if DL data of UE is for radio bearer (s) configured for SDT (or MT-SDT) and total volume of DL data of UE configured for SDT (or MT-SDT) is less than a data volume threshold; here it is assumed that DL data/signaling is not available for radio bearer(s) not configured for SDT or MT-SDT) (note that "DL data" refers to data and/or signaling received from UPF and AMF respectively; DL data can consists of multiple packets/PDUs; data volume threshold can be pre-defined or can be configured by O&M function in the network or can be signaled by AMF to gNB; volume can be in bits or bytes):

(Alternate) If volume of DL data for UE<=data volume threshold (or if DL data of UE is for radio bearer (s) configured for SDT (or MT-SDT) and total volume of DL data of UE configured for SDT (or MT-SDT) is less than or equal to a data volume threshold; here it is assumed that DL data/signaling is not available for radio bearer(s) not configured for SDT or MT-SDT) (note that "DL data" refers to data and/or signaling received from UPF and AMF respectively; DL data can consists of multiple packets/PDUs; data volume threshold can be pre-defined or can be configured by O&M function in the network or can be signaled by AMF to gNB):

(Alternate) If UE supports MT-SDT and gNB supports MT-SDT (or the cell(s) via which RAN paging is transmitted supports MT-SDT) and If volume of DL data for UE<data volume threshold (or If UE supports MT-SDT and gNB supports MT-SDT (or the cell(s) via which RAN paging is transmitted supports MT-SDT) and if DL data of UE is for radio bearer (s) configured for SDT (or MT-SDT) and total volume of DL data of UE configured for SDT (or MT-SDT) is less than a data volume threshold; here it is assumed that DL data/signaling is not available for radio bearer(s) not configured for SDT or MT-SDT) (note that "DL data" refers to data and/or signaling received from UPF and AMF respectively; DL data can consists of multiple packets/PDUs; data volume threshold can be pre-defined or can be configured by O&M function in the network or can be signaled by AMF to gNB):

(Alternate) If UE supports MT-SDT and gNB supports MT-SDT (or the cell(s) via which RAN paging is transmitted supports MT-SDT) and If volume of DL data for UE<=data volume threshold (or If UE supports MT-SDT and gNB supports MT-SDT (or the cell(s) via which RAN paging is transmitted supports MT-SDT) and if DL data of UE is for radio bearer (s) configured for SDT (or MT-SDT) and total volume of DL data of UE configured for SDT (or MT-SDT) is less than or equal to a data volume threshold; here it is assumed that DL data/signaling is not available for radio bearer(s) not configured for SDT or MT-SDT) (note that "DL data" refers to data and/or signaling received from UPF and AMF respectively; DL data can consists of multiple packets/PDUs; data volume threshold can be pre-defined or can be configured by O&M function in the network or can be signaled by AMF to gNB):

gNB X includes SDT indication in paging message sent on Xn to gNB Y.

Else gNB X does not include SDT indication in paging message sent on Xn to gNB Y.

gNB Y upon receiving paging message from last serving gNB (gNB X) for RAN paging (i.e. I-RNTI is included in paging message)

if received paging message includes SDT indication (and gNB Y supports MT SDT):

(Alternate) if received paging message includes SDT indication and gNB Y supports MT SDT:

UE is paged with I-RNTI (e.g. full I-RNTI) and SDT indication is included for the UE in paging message. gNB Y generates paging message wherein the I-RNTI of UE is included in the paging message. MT-SDT indication is also included in the paging message for the UE. Paging record is added in paging message wherein the paging record includes I-RNTI and MT-SDT indication. Paging record is included in list of paging records wherein list is common for UEs with MT-SDT indication and for UEs without MT-SDT indication. In an embodiment instead of MT SDT indication, a list of paging records for MT-SDT can be included and this list includes paging record for the UE wherein paging record includes the I-RNTI of UE. Note that this list of paging records for MT-SDT is different from list of paging records in existing system used for paging not intended for MT-SDT. gNB Y transmits PDCCH addressed to P-RNTI in the PO of UE wherein the scheduling information for paging message is included in the DCI of PDCCH. gNB Y transmits the paging message on PDSCH as per the scheduling information included in DCI. gNB Y may also transmit early paging indication before the UE's PO wherein the early paging indication indicates that there is paging for the UE or for the UE's paging subgroup. UE may belong to a paging subgroup wherein the paging sub group is assigned by core network or determined by UE based on UE identity.

else

UE is paged with I-RNTI (e.g. full I-RNTI). SDT indication is not included for the UE in paging message. gNB Y generates paging message wherein the I-RNTI of UE is included in the paging message. MT-SDT indication is not included in the paging message for the UE. Paging record is added in paging message wherein the paging record includes I-RNTI and does not include MT-SDT indication. Paging record is included in list of paging records wherein list is common for UEs with MT-SDT indication and for UEs without MT-SDT indication. In an embodiment wherein the list of paging records in paging message are different for MT-SDT and non MT-SDT, paging record for UE including UE's I-RNTI is included in list of paging records not intended for MT-SDT. gNB Y transmits PDCCH addressed to P-RNTI in the PO of UE wherein the scheduling information for paging message is included in the DCI of PDCCH. gNB Y transmits the paging message as per the scheduling information included in DCI. gNB Y may also transmit early paging indication before the UE's PO wherein the early paging indication indicates that there is paging for the UE or for the UE's paging subgroup. UE may belong to a paging subgroup wherein the paging sub group is assigned by core network or determined by UE based on UE identity.

In one example, last serving gNB (say gNB X) sends paging message via Xn interface to another gNB (say gNB Y) in RAN Notification Area (RNA) of UE.

Paging information like I-RNTI, UE index etc. is included in paging message sent on Xn.

If volume of DL data received from UPF for UE<data volume threshold (or if DL data of UE received from UPF is for radio bearer (s) configured for SDT (or MT-SDT) and total volume of DL data of UE configured for SDT (or MT-SDT) is less than a data volume threshold; here it is assumed that DL data/signaling is not available for radio bearer(s) not configured for SDT or MT-SDT) (note that "DL data" refers to data and/or signaling received from UPF and AMF respectively; DL data can consists of multiple packets/PDUs; data volume threshold can be pre-defined or can be configured by O&M function in the network or can be signaled by AMF to gNB; volume can be in bits or bytes):

(Alternate) If volume of DL data received from UPF for UE<=data volume threshold (or if DL data of UE received from UPF is for radio bearer (s) configured for SDT (or MT-SDT) and total volume of DL data of UE configured for SDT (or MT-SDT) is less than or equal to a data volume threshold; here it is assumed that DL data/signaling is not available for radio bearer(s) not configured for SDT or MT-SDT) (note that "DL data" refers to data and/or signaling received from UPF and AMF respectively; DL data can consists of multiple packets/PDUs; data volume threshold can be pre-defined or can be configured by O&M function in the network or can be signaled by AMF to gNB):

(Alternate) If UE supports MT-SDT and gNB supports MT-SDT (or the cell(s) via which RAN paging is transmitted supports MT-SDT) and If volume of DL data received from UPF for UE<data volume threshold (or If UE supports MT-SDT and gNB supports MT-SDT (or the cell(s) via which RAN paging is transmitted supports MT-SDT) and if DL data of UE received from UPF is for radio bearer (s) configured for SDT (or MT-SDT) and total volume of DL data of UE configured for SDT (or MT-SDT) is less than a data volume threshold; here it is assumed that DL data/signaling is not available for radio bearer(s) not configured for SDT or MT-SDT) (note that "DL data" refers to data and/or signaling received from UPF and AMF respectively; DL data can consists of multiple packets/PDUs; data volume threshold can be pre-defined or can be configured by O&M function in the network or can be signaled by AMF to gNB):

(Alternate) If UE supports MT-SDT and gNB supports MT-SDT (or the cell(s) via which RAN paging is transmitted supports MT-SDT) and If volume of DL data received from UPF for UE<=data volume threshold (or If UE supports MT-SDT and gNB supports MT-SDT (or the cell(s) via which RAN paging is transmitted supports MT-SDT) and if DL data of UE received from UPF is for radio bearer (s) configured for SDT (or MT-SDT) and total volume of DL data of UE configured for SDT (or MT-SDT) is less than or equal to a data volume threshold; here it is assumed that DL data/signaling is not available for radio bearer(s) not configured for SDT or MT-SDT) (note that "DL data" refers to data and/or signaling received from UPF and AMF respectively; DL data can consists of multiple packets/PDUs; data volume threshold can be pre-defined or can be configured by O&M function in the network or can be signaled by AMF to gNB):

gNB X includes SDT indication in paging message sent on Xn to gNB Y.

Else if specific signaling message(s) for UE are received from AMF (specific signaling message can be pre-defined signaling message or any signaling message except paging message, UE Context Release Command message)

gNB X includes SDT indication in paging message sent on Xn to gNB Y.

Else gNB X does not include SDT indication in paging message sent on Xn to gNB Y.

gNB Y upon receiving paging message from last serving gNB (gNB X) for RAN paging (i.e. I-RNTI is included in paging message)

if received paging message includes SDT indication (and gNB Y supports MT SDT):

(Alternate) if received paging message includes SDT indication and gNB Y supports MT SDT:

UE is paged with I-RNTI (e.g. full I-RNTI) and SDT indication is included for the UE in paging message. gNB Y generates paging message wherein the I-RNTI of UE is included in the paging message. MT-SDT indication is also included in the paging message for the UE. Paging record is added in paging message wherein the paging record includes I-RNTI and MT-SDT indication. Paging record is included in list of paging records wherein list is common for UEs with MT-SDT indication and for UEs without MT-SDT indication. In an embodiment instead of MT SDT indication, a list of paging records for MT-SDT can be included and this list includes paging record for the UE wherein paging record includes the I-RNTI of UE. Note that this list of paging records for MT-SDT is different from list of paging records in existing system used for paging not intended for MT-SDT. gNB Y transmits PDCCH addressed to P-RNTI in the PO of UE wherein the scheduling information for paging message is included in the DCI of PDCCH. gNB Y transmits the paging message as per the scheduling information included in DCI. gNB Y may also transmit early paging indication before the UE's PO wherein the early paging indication indicates that there is paging for the UE or for the UE's paging subgroup. UE may belong to a paging subgroup wherein the paging sub group is assigned by core network or determined by UE based on UE identity.

else

UE is paged with I-RNTI (e.g. full I-RNTI). SDT indication is not included for the UE in paging message. gNB Y generates paging message wherein the I-RNTI of UE is included in the paging message. MT-SDT indication is not included in the paging message for the UE. Paging record is added in paging message wherein the paging record includes I-RNTI and does not include MT-SDT indication. Paging record is included in list of paging records wherein list is common for UEs with MT-SDT indication and for UEs without MT-SDT indication. In an embodiment wherein the list of paging records in paging message are different for MT-SDT and non MT-SDT, paging record for UE including UE's I-RNTI is included in list of paging records not intended for MT-SDT. gNB Y transmits PDCCH addressed to P-RNTI in the PO of UE wherein the scheduling information for paging message is included in the DCI of PDCCH. gNB Y transmits the paging message as per the scheduling information included in DCI. gNB Y may also transmit early paging indication before the UE's PO wherein the early paging indication indicates that there is paging for the UE or for the UE's paging subgroup. UE may belong to a paging subgroup wherein the paging sub group is assigned by core network or determined by UE based on UE identity.

Figure 3:
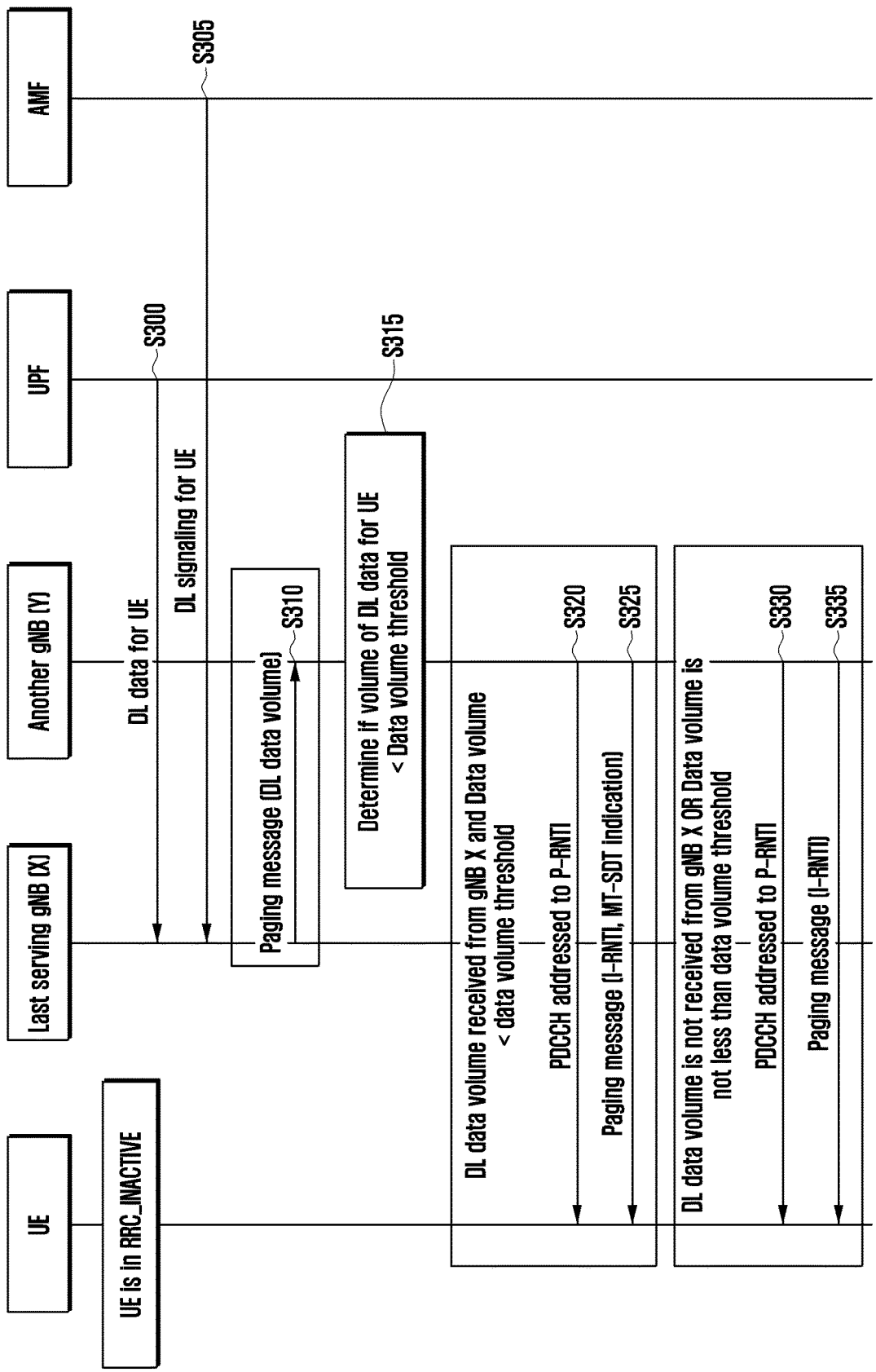
FIG. 3 illustrates a RAN paging via one or more cells of another gNB according to an embodiment of the disclosure.

FIG. 3 illustrates a RAN paging via one or more cells of another gNB according to an embodiment of the disclosure.

Referring to FIG. 3, in operation S300, a gNB (gNB X, e.g., last serving gNB of RRC_INACTIVE UE) may receive DL data for the RRC_INACTIVE UE from a UPF.

In operation S305, the gNB may receive DL UE-associated signaling (except the UE Context Release Command message, paging message) for RRC_INACTIVE UE from an AMF.

In operation S310, the gNB may send a paging message to another gNB (gNB Y) in the same RAN notification area (RNA) a paging message on an Xn interface. The paging message may include paging information which comprises at least one of -RNTI, UE index (i.e. 5G-S-TMSI mod 1024 or 5G-S-TMSI mod P where P is one of 1024, 2048, 4096 etc.), UE's DRX cycle received from AMF, or UE's RAN DRX cycle configured in RRC Release message. The paging message may also include volume of DL data available in the gNB X's buffers for UE. If UE supports MT-SDT, the paging message may also include volume of DL data available in the gNB X's buffers for UE. Volume can be in bits or bytes. The volume of DL data may be for radio bearer(s) configured for SDT or MT-SDT. Note that "DL data" refers to data and/or signaling received from UPF and AMF respectively; DL data can consists of multiple packets/PDUs.

In operation S315, the gNB Y may determine if volume of DL data and/or DL UE-associated signaling is less than a data volume threshold (or gNB Y may determine if DL data/signaling is for radio bearer (s) configured for SDT (or MT-SDT) and total volume of DL data and/or signaling for radio bearer (s) configured for SDT (or MT-SDT) is less than a data volume threshold; here it is assumed that DL data/ signaling is not available for radio bearer(s) not configured for SDT or MT-SDT). Alternatively, the gNB Y may determine if volume of DL data and/or DL UE-associated signaling is equal to or less than a data volume threshold (or gNB Y may determine if DL data/signaling is for radio bearer (s) configured for SDT (or MT-SDT) and total volume of DL data and/or signaling for radio bearer (s) configured for SDT (or MT-SDT) is less than or equal to a data volume threshold; here it is assumed that DL data/ signaling is not available for radio bearer(s) not configured for SDT or MT-SDT). The data volume threshold can be pre-defined or can be configured by O&M function in the network or can be signaled by AMF to the gNB Y.

If volume of DL data and/or DL UE-associated signaling is less than the data volume threshold or if volume of DL data and/or DL UE-associated signaling is equal to or less than the data volume threshold (or if DL data/signaling is for radio bearer (s) configured for SDT (or MT-SDT) and total volume of DL data and/or signaling for radio bearer (s) configured for SDT (or MT-SDT) is less than (or less than or equal to) a data volume threshold; here it is assumed that DL data/signaling is not available for radio bearer(s) not configured for SDT), the gNB Y may transmit, in operation S320, a PDCCH addressed to P-RNTI in a PO of the UE wherein the scheduling information for paging message is included in DCI of the PDCCH. The gNB Y may transmit, in operation S325, the paging message on PDSCH as per the scheduling information included in DCI. The UE may be paged with I-RNTI (e.g. full I-RNTI) and an SDT indication (or MT-SDT indication) may be included in the paging message. The I-RNTI of the UE may be included in the paging message. MT-SDT indication may be also included in the paging message for the UE. A paging record is included in the paging message where the paging record includes the I-RNTI and MT-SDT indication. Paging record is included in list of paging records wherein list is common for UEs with MT-SDT indication and for UEs without MT-SDT indication. In an embodiment instead of MT SDT indication, a list of paging records for MT-SDT can be included and this list includes paging record for the UE wherein paging record includes the I-RNTI of UE. Note that this list of paging records for MT-SDT is different from list of paging records in existing system used for paging not intended for MT-SDT.

If volume of DL data and/or DL UE-associated signaling is larger than the data volume threshold or if volume of DL data and/or DL UE-associated signaling is equal to or larger than the data volume threshold (or if DL data/signaling is for radio bearer (s) configured for SDT (or MT-SDT) and total volume of DL data and/or signaling for radio bearer (s) configured for SDT (or MT-SDT) is larger than (or larger than or equal to) a data volume threshold; or if DL data/ signaling is available for radio bearer(s) configured for SDT or MT-SDT), the gNB Y may transmit, in operation S330, a PDCCH addressed to P-RNTI in a PO of the UE wherein the scheduling information for paging message is included in DCI of the PDCCH. The gNB Y may transmit, in operation S335, the paging message on PDSCH as per the scheduling information included in DCI. The UE may be paged with I-RNTI (e.g. full I-RNTI) and an SDT indication (or MT-SDT indication) may not be included in the paging message. The I-RNTI of the UE may be included in the paging message. MT-SDT indication may not be included in the paging message for the UE. A paging record is included in the paging message where the paging record includes the I-RNTI and the MT-SDT indication may not be included in the paging record. Paging record is included in list of paging records wherein list is common for UEs with MT-SDT indication and for UEs without MT-SDT indication. In an embodiment wherein the list of paging records in paging message are different for MT-SDT and non MT-SDT, paging record for UE including UE's I-RNTI is included in list of paging records not intended for MT-SDT.

In one example, last serving gNB (say gNB X) sends paging message via Xn interface to another gNB (say gNB Y) in RAN Notification Area (RNA) of UE Paging information like I-RNTI, UE index (i.e. 5G-S-TMSI mod 1024 or 5G-S-TMSI mod P where P is one of 1024, 2048, 4096 etc.), UE's DRX cycle received from AMF, UE's RAN DRX cycle configured in RRC Release message etc. is included in paging message sent on Xn. gNB X also includes volume of DL data available in its buffers for UE in in paging message sent on Xn or if UE supports MT-SDT, gNB X also includes volume of DL data available in its buffers for UE in in paging message sent on Xn. Volume can be in bits or bytes. Note that "DL data" refers to data and/or signaling received from UPF and AMF respectively; DL data can consist of multiple packets/PDUs;

gNB Y upon receiving paging message from last serving gNB (gNB X) for RAN paging (i.e. I-RNTI is included in paging message)

if received paging message includes data volume:
    (Alternate) if received paging message includes data volume and gNB Y supports MT SDT:
      If volume of DL data received in paging message<data volume threshold:
    (Alternate) If volume of DL data received in paging message<=data volume threshold:
    (Alternate) If UE supports MT-SDT and gNB supports MT-SDT (or the cell(s) via which RAN paging is transmitted supports MT-SDT) and If volume of DL data received in paging message<data volume threshold:
    (Alternate) If UE supports MT-SDT and gNB supports MT-SDT (or the cell(s) via which RAN paging is transmitted supports MT-SDT) and If volume of DL data received in paging message<=data volume threshold:
      UE is paged with I-RNTI (e.g. full I-RNTI) and SDT indication is included for the UE in paging message. gNB Y generates paging message wherein the I-RNTI of UE is included in the paging message. MT-SDT indication is also included in the paging message for the UE. Paging record is added in paging message wherein the paging record includes I-RNTI and MT-SDT indication. Paging record is included in list of paging records wherein list is common for UEs with MT-SDT indication and for UEs without MT-SDT indication. In an embodiment instead of MT SDT indication, a list of paging records for MT-SDT can be included and this list includes paging record for the UE wherein paging record includes the I-RNTI of UE. Note that this list of paging records for MT-SDT is different from list of paging records in existing system used for paging not intended for MT-SDT. gNB Y transmits PDCCH addressed to P-RNTI in the PO of UE wherein the scheduling information for paging message is included in the DCI of PDCCH. gNB Y transmits the paging message on PDSCH as per the scheduling information included in DCI. gNB Y may also transmit early paging indication before the UE's PO wherein the early paging indication indicates that there is paging for the UE or for the UE's paging subgroup. UE may belong to a paging subgroup wherein the paging sub group is assigned by core network or determined by UE based on UE identity.
    else
      UE is paged with I-RNTI (e.g. full I-RNTI). SDT indication is not included for the UE in paging message. gNB Y generates paging message wherein the I-RNTI of UE is included in the paging message. MT-SDT indication is not included in the paging message for the UE. Paging record is added in paging message wherein the paging record includes I-RNTI and does not include MT-SDT indication. Paging record is included in list of paging records wherein list is common for UEs with MT-SDT indication and for UEs without MT-SDT indication. In an embodiment wherein the list of paging records in paging message are different for MT-SDT and non MT-SDT, paging record for UE including UE's I-RNTI is included in list of paging records not intended for MT-SDT. gNB Y transmits PDCCH addressed to P-RNTI in the PO of UE wherein the scheduling information for paging message is included in the DCI of PDCCH. gNB Y transmits the paging message as per the scheduling information included in DCI. gNB Y may also transmit early paging indication before the UE's PO wherein the early paging indication indicates that there is paging for the UE or for the UE's paging subgroup. UE may belong to a paging subgroup wherein the paging sub group is assigned by core network or determined by UE based on UE identity.

In one example, last serving gNB (say gNB X) sends paging message via Xn interface to another gNB (say gNB Y) in RAN Notification Area (RNA) of UE.

Paging information like I-RNTI, UE index (i.e. 5G-S-TMSI mod 1024 or 5G-S-TMSI mod P where P is one of 1024, 2048, 4096 etc.), UE's DRX cycle received from AMF, UE's RAN DRX cycle configured in RRC Release message etc. is included in paging message sent on Xn. If data is received from UPF, gNB X also includes volume of DL data available in its buffers for UE in paging message sent on Xn or if UE supports MT-SDT and If data is received from UPF, gNB X also includes volume of DL data available in its buffers for UE in in paging message sent on Xn. Volume can be in bits or bytes. DL data can consist of multiple packets/PDUs. If specific signaling message (s) for UE are received from AMF, gNB X indicate the same to gNB Y in paging message sent on Xn. Specific signaling message can be pre-defined signaling message or any signaling message.

gNB Y upon receiving paging message from last serving gNB (gNB X) for RAN paging (i.e. I-RNTI is included in paging message)

if received paging message includes data volume:
    (Alternate) if received paging message includes data volume and gNB Y supports MT SDT:
      If volume of DL data received in paging message<data volume threshold:
    (Alternate) If volume of DL data received in paging message<=data volume threshold:
    (Alternate) If UE supports MT-SDT and gNB supports MT-SDT (or the cell(s) via which RAN paging is transmitted supports MT-SDT) and If volume of DL data received in paging message<data volume threshold:

(Alternate) If UE supports MT-SDT and gNB supports MT-SDT (or the cell(s) via which RAN paging is transmitted supports MT-SDT) and If volume of DL data received in paging message<=data volume threshold:

UE is paged with I-RNTI (e.g. full I-RNTI) and SDT indication is included for the UE in paging message. gNB Y generates paging message wherein the I-RNTI of UE is included in the paging message. MT-SDT indication is also included in the paging message for the UE. Paging record is added in paging message wherein the paging record includes I-RNTI and MT-SDT indication. Paging record is included in list of paging records wherein list is common for UEs with MT-SDT indication and for UEs without MT-SDT indication. In an embodiment instead of MT SDT indication, a list of paging records for MT-SDT can be included and this list includes paging record for the UE wherein paging record includes the I-RNTI of UE. Note that this list of paging records for MT-SDT is different from list of paging records in existing system used for paging not intended for MT-SDT. gNB Y transmits PDCCH addressed to P-RNTI in the PO of UE wherein the scheduling information for paging message is included in the DCI of PDCCH. gNB Y transmits the paging message on PDSCH as per the scheduling information included in DCI. gNB Y may also transmit early paging indication before the UE's PO wherein the early paging indication indicates that there is paging for the UE or for the UE's paging subgroup. UE may belong to a paging subgroup wherein the paging sub group is assigned by core network or determined by UE based on UE identity.

else

UE is paged with I-RNTI (e.g. full I-RNTI). SDT indication is not included for the UE in paging message. gNB Y generates paging message wherein the I-RNTI of UE is included in the paging message. MT-SDT indication is not included in the paging message for the UE. Paging record is added in paging message wherein the paging record includes I-RNTI and does not include MT-SDT indication. Paging record is included in list of paging records wherein list is common for UEs with MT-SDT indication and for UEs without MT-SDT indication. In an embodiment instead of MT SDT indication, a list of paging records for MT-SDT can be included and this list includes paging record for the UE wherein paging record includes the I-RNTI of UE. Note that this list of paging records for MT-SDT is different from list of paging records in existing system used for paging not intended for MT-SDT. gNB Y transmits PDCCH addressed to P-RNTI in the PO of UE wherein the scheduling information for paging message is included in the DCI of PDCCH. gNB Y transmits the paging message as per the scheduling information included in DCI. gNB Y may also transmit early paging indication before the UE's PO wherein the early paging indication indicates that there is paging for the UE or for the UE's paging subgroup. UE may belong to a paging subgroup wherein the paging sub group is assigned by core network or determined by UE based on UE identity.

Else if received paging message includes indication of availability of specific signaling message(s) (Specific signaling message can be pre-defined signaling message or any signaling message except paging message or context release message):

(Alternate) else if received paging message includes indication of availability of specific signaling message(s) and gNB Y supports MT SDT (Specific signaling message can be pre-defined signaling message or any signaling message except paging message or context release message):

UE is paged with I-RNTI (e.g. full I-RNTI) and SDT indication is included for the UE in paging message. gNB Y generates paging message wherein the I-RNTI of UE is included in the paging message. MT-SDT indication is also included in the paging message for the UE. Paging record is added in paging message wherein the paging record includes I-RNTI and MT-SDT indication. Paging record is included in list of paging records wherein list is common for UEs with MT-SDT indication and for UEs without MT-SDT indication. In an embodiment instead of MT SDT indication, a list of paging records for MT-SDT can be included and this list includes paging record for the UE wherein paging record includes the I-RNTI of UE. Note that this list of paging records for MT-SDT is different from list of paging records in existing system used for paging not intended for MT-SDT. gNB Y transmits PDCCH addressed to P-RNTI in the PO of UE wherein the scheduling information for paging message is included in the DCI of PDCCH. gNB Y transmits the paging message on PDSCH as per the scheduling information included in DCI. gNB Y may also transmit early paging indication before the UE's PO wherein the early paging indication indicates that there is paging for the UE or for the UE's paging subgroup. UE may belong to a paging subgroup wherein the paging sub group is assigned by core network or determined by UE based on UE identity.

else

UE is paged with I-RNTI (e.g. full I-RNTI). SDT indication is not included for the UE in paging message. gNB Y generates paging message wherein the I-RNTI of UE is included in the paging message. MT-SDT indication is not included in the paging message for the UE. Paging record is added in paging message wherein the paging record includes I-RNTI and does not include MT-SDT indication. Paging record is included in list of paging records wherein list is common for UEs with MT-SDT indication and for UEs without MT-SDT indication. In an embodiment instead of MT SDT indication, a list of paging records for MT-SDT can be included and this list includes paging record for the UE wherein paging record includes the I-RNTI of UE. Note that this list of paging records for MT-SDT is different from list of paging records in existing system used for paging not intended for MT-SDT. gNB Y transmits PDCCH addressed to P-RNTI in the PO of UE wherein the scheduling information for paging message is included in the DCI of PDCCH. gNB Y transmits the paging message as per the scheduling information included in DCI. gNB Y may also transmit early paging indication before the UE's PO wherein the early paging indication indicates that there is paging for the UE or for the UE's paging subgroup. UE may belong to a paging subgroup wherein the paging sub group is assigned by core network or determined by UE based on UE identity.

In an embodiment, if last serving gNB receives paging message from AMF for UE, gNB sends paging message to UE wherein the paging message includes UE's 5G-S-TMSI and MT-SDT indication is not included. A paging record with 5G-S-TMSI is included and MT-SDT indication is included in this paging record. Last serving gNB may also send paging message to another gNB on Xn interface and paging message includes UE's 5G-S-TMSI. gNB upon receiving Xn paging message including 5G-S-TMSI, generates paging message wherein the paging message incudes 5G-S-TMSI and MT-SDT indication is not included. A paging record with 5G-S-TMSI is included and MT-SDT indication is not included in this paging record.

UE Operation

UE receives paging message. Paging message includes its I-RNTI. Paging message also include SDT indication (or MT-SDT indication) for UE In an embodiment, upon receiving the paging message including its I-RNTI and MT-SDT (or SDT) indication, UE operation is as follows:

UE selects the UL carrier (NUL or SUL) of the serving cell for SDT (currently camped cell is considered as serving cell for SDT). If SUL is not configured in the Serving cell for SDT (currently camped cell is considered as serving cell for SDT) UE selects NUL. If SUL is configured in the Serving cell for SDT and if the RSRP of the downlink pathloss reference is less than sdt-RSRP-ThresholdSSB-SUL, UE selects SUL carrier. If SUL is configured in the Serving cell for SDT and if the RSRP of the downlink pathloss reference is greater than or equal to sdt-RSRP-ThresholdSSB-SUL, UE selects NUL carrier.

If CG-SDT is configured on the selected UL carrier (i.e. CG Type 1 PUSCH resources for selected UL carrier are signaled by gNB and cg-SDT-TimeAlignmentTimer is running. Note that when cg-SDT-TimeAlignmentTimer expires, signaled CG Type 1 PUSCH resources are released by UE and are no longer considered to be configured. Also CG Type 1 PUSCH resources for selected UL carrier are signaled by gNB in RRC Release message and they are considered to be configured for the serving cell from which RRC Release message is received) and CG type 1 resources for SDT are valid and if at least one of the SSBs for which the CG-SDT resources are configured on selected UL carrier has SS-RSRP above cg-SDT-RSRP-ThresholdSSB:

UE selects the CG-SDT procedure for MT-SDT. UE transmits RRC resume request in CG type 1 PUSCH resource of selected UL carrier. CG-SDT resources are signaled by gNB in RRC Release message.

Else if RA-SDT resources (2 step and/or 4 step) are configured on selected UL carrier:

UE selects the RA-SDT procedure for MT-SDT.

If only 2 step RA-SDT resources are configured on the selected UL carrier, UE select 2 step RA-SDT procedure for MT-SDT If only 4 step RA-SDT resources are configured on the selected UL carrier, UE select 4 step RA-SDT procedure for MT-SDT If both 2 step RA-SDT resources and 4 step RA-SDT resources are configured on the selected UL carrier:

If RSRP of the downlink pathloss reference is above msgA-RSRP-Threshold, UE select 2 step RA-SDT procedure for MT-SDT. Otherwise, UE select 4 step RA-SDT procedure for MT-SDT In case of 2 step RA SDT procedure, 2 step Random access resources (preambles/ROs/POs) configured for SDT are used during the random access procedure. UE transmits RRC resume request in MSGA MAC PDU.

In case of 4 step RA SDT procedure, 4 step Random access resources (preambles/ROs) configured for SDT are used during the random access procedure. UE transmits RRC resume request in MSG3 MAC PDU.

Else (i.e. neither 2 step nor 4 step RA-SDT resources are configured on selected UL carrier)

UE does not initiate SDT (i.e. MT-SDT) procedure. UE initiate the RRC connection resume procedure.

CG-SDT Resource Validity Criteria

RRC configures the following parameters for validation for CG-SDT:

cg-SDT-RSRP-ChangeThreshold: RSRP threshold for the increase/decrease of RSRP for time alignment validation;

nrofSS-BlocksToAverage: number of SSBs with highest RSRPs for derivation of downlink pathloss reference for TA validation;

absThreshSS-BlocksConsolidation: absolute RSRP threshold for determining the set of SSBs for derivation of downlink pathloss reference for TA validation.

For TA validation for CG-SDT, the downlink pathloss reference RSRP is derived as the linear average of the power values of up to nrofSS-BlocksToAverage of the highest beam measurement quantity values above absThreshSS-BlocksConsolidation.

(Alternate) For TA validation for CG-SDT, the downlink pathloss reference RSRP is derived as the linear average of the power values of up to nrofSS-BlocksToAverage of the highest beam measurement quantity values above absThreshSS-BlocksConsolidation. If there are no beam measurement quantity values above absThreshSS-BlocksConsolidation, downlink pathloss reference RSRP is derived as the highest beam measurement quantity value.

(Alternate) For TA validation for CG-SDT, the downlink pathloss reference RSRP is derived as the linear average of the power values of up to nrofSS-BlocksToAverage of the highest beam measurement quantity values.

UE shall consider the CG-SDT resource to be valid when the following conditions are fulfilled:

compared to the stored downlink pathloss reference RSRP value at the UE's last uplink transmission (or first uplink transmission), the RSRP has not increased/decreased by more than cg-SDT-RSRP-ChangeThreshold, if configured.

(Alternate) compared to the stored downlink pathloss reference RSRP value when the cg-SDT-TimeAlignmentTimer was last (re-) started, the RSRP has not increased/decreased by more than cg-SDT-RSRP-ChangeThreshold, if configured.

(Alternate) compared to the stored downlink pathloss reference RSRP value when the TA was last received (or when the TA values received from gNB in RAR/MsgB/MAC CE was applied), the RSRP has not increased/decreased by more than cg-SDT-RSRP-ChangeThreshold, if configured.

In an embodiment, UE is in RRC INACTIVE state. UE receives one of a) indication from upper layer (i.e. NAS) to resume connection or b) paging message including its I-RNTI and MT-SDT (or SDT) indication is received.

If Paging message including I-RNTI and SDT indication (or MT-SDT indication) is received:
- UE selects the UL carrier (NUL or SUL). If SUL is not configured in the Serving cell for SDT (currently camped cell is considered as serving cell for SDT) UE selects NUL. If SUL is configured in the Serving cell for SDT and if the RSRP of the downlink pathloss reference is less than sdt-RSRP-ThresholdSSB-SUL, UE selects SUL carrier. If SUL is configured in the Serving cell for SDT and if the RSRP of the downlink pathloss reference is greater than or equal to sdt-RSRP-ThresholdSSB-SUL, UE selects NUL carrier.
- If CG-SDT is configured on the selected UL carrier (i.e. CG Type 1 PUSCH resources for selected UL carrier are signaled by gNB and cg-SDT-TimeAlignmentTimer is running. Note that when cg-SDT-TimeAlignmentTimer expires, signaled CG Type 1 PUSCH resources are released by UE and are no longer considered to be configured. Also CG Type 1 PUSCH resources for selected UL carrier are signaled by gNB in RRC Release message and they are considered to be configured for the serving cell from which RRC Release message is received) and CG type 1 resources for SDT are valid and if at least one of the SSBs for which the CG-SDT resources are configured on selected UL carrier has SS-RSRP above cg-SDT-RSRP-ThresholdSSB:
  - UE selects the CG-SDT procedure for SDT. UE transmits RRC resume request in CG type 1 PUSCH resource of selected UL carrier. CG-SDT resources are signaled by gNB in RRC Release message.
- Else if RA-SDT resources (2 step and/or 4 step) are configured on selected UL carrier:
  - UE selects the RA-SDT procedure for SDT.
    - If only 2 step RA-SDT resources are configured on the selected UL carrier, UE select 2 step RA-SDT procedure for SDT
    - If only 4 step RA-SDT resources are configured on the selected UL carrier, UE select 4 step RA-SDT procedure for SDT
    - If both 2 step RA-SDT resources and 4 step RA-SDT resources are configured on the selected UL carrier:
      - If RSRP of the downlink pathloss reference is above msgA-RSRP-Threshold, UE select 2 step RA-SDT procedure for SDT. Otherwise, UE select 4 step RA-SDT procedure for MT-SDT
    - In case of 2 step RA SDT procedure, 2 step Random access resources (preambles/ROs/POs) configured for SDT are used during the random access procedure. UE transmits RRC resume request in MSGA MAC PDU.
    - In case of 4 step RA SDT procedure, 4 step Random access resources (preambles/ROs) configured for SDT are used during the random access procedure. UE transmits RRC resume request in MSG3 MAC PDU.
- Else (i.e. neither 2 step nor 4 step RA-SDT resources are configured on selected UL carrier)
  - UE does not initiate SDT (i.e. SDT) procedure. UE initiate the RRC connection resume procedure.

Else If indication from upper layer (i.e. NAS) to resume connection is received:
- if the data volume of the pending UL data across all RBs configured for SDT is less or equal to sdt-DataVolumeThreshold; and if the RSRP of the downlink pathloss reference is higher than sdt-RSRP-Threshold, if configured:
  - UE selects the UL carrier (NUL or SUL) of the serving cell for SDT. If SUL is not configured in the Serving cell for SDT (currently camped cell is considered as serving cell for SDT) UE selects NUL. If SUL is configured in the Serving cell for SDT and if the RSRP of the downlink pathloss reference is less than sdt-RSRP-ThresholdSSB-SUL, UE selects SUL carrier. If SUL is configured in the Serving cell for SDT and if the RSRP of the downlink pathloss reference is greater than or equal to sdt-RSRP-ThresholdSSB-SUL, UE selects NUL carrier.
  - If CG-SDT is configured on the selected UL carrier (i.e. CG Type 1 PUSCH resources for selected UL carrier are signaled by gNB and cg-SDT-TimeAlignmentTimer is running. Note that when cg-SDT-TimeAlignmentTimer expires, signaled CG Type 1 PUSCH resources are released by UE and are no longer considered to be configured. Also CG Type 1 PUSCH resources for selected UL carrier are signaled by gNB in RRC Release message and they are considered to be configured for the serving cell from which RRC Release message is received) and CG type 1 resources for SDT are valid and if at least one of the SSBs for which the CG-SDT resources are configured on selected UL carrier has SS-RSRP above cg-SDT-RSRP-ThresholdSSB:
    - UE selects the CG-SDT procedure for SDT. UE transmits RRC resume request in CG type 1 PUSCH resource of selected UL carrier. CG-SDT resources are signaled by gNB in RRC Release message.
  - Else if RA-SDT resources (2 step and/or 4 step) are configured on selected UL carrier:
    - UE selects the RA-SDT procedure for MT-SDT.
      - If only 2 step RA-SDT resources are configured on the selected UL carrier, UE select 2 step RA-SDT procedure for SDT
      - If only 4 step RA-SDT resources are configured on the selected UL carrier, UE select 4 step RA-SDT procedure for SDT
      - If both 2 step RA-SDT resources and 4 step RA-SDT resources are configured on the selected UL carrier:
        - If RSRP of the downlink pathloss reference is above msgA-RSRP-Threshold, UE select 2 step RA-SDT procedure for SDT. Otherwise, UE select 4 step RA-SDT procedure for SDT
      - In case of 2 step RA SDT procedure, 2 step Random access resources (preambles/ROs/POs) configured for SDT are used during the random access procedure. UE transmits RRC resume request in MSGA MAC PDU.
      - In case of 4 step RA SDT procedure, 4 step Random access resources (preambles/ROs) configured for SDT are used during the random access procedure. UE transmits RRC resume request in MSG3 MAC PDU.
  - Else (i.e. neither 2 step nor 4 step RA-SDT resources are configured on selected UL carrier)

UE does not initiate SDT procedure. UE initiate the RRC connection resume procedure.

In an embodiment, upon receiving the paging message including its I-RNTI and MT-SDT (or SDT) indication, UE operation is as follows:

UE selects the UL carrier (NUL or SUL) of the serving cell for SDT. If SUL is not configured in the Serving cell for SDT (currently camped cell is considered as serving cell for SDT) UE selects NUL. If SUL is configured in the Serving cell for SDT and if the RSRP of the downlink pathloss reference is less than sdt-RSRP-ThresholdSSB-SUL, UE selects SUL carrier. If SUL is configured in the Serving cell for SDT and if the RSRP of the downlink pathloss reference is greater than or equal to sdt-RSRP-ThresholdSSB-SUL, UE selects NUL carrier.

If CG-SDT is configured on the selected UL carrier (i.e. CG Type 1 PUSCH resources for selected UL carrier are signaled by gNB and cg-SDT-TimeAlignment-Timer is running. Note that when cg-SDT-TimeAlignmentTimer expires, signaled CG Type 1 PUSCH resources are released by UE and are no longer considered to be configured. Also CG Type 1 PUSCH resources for selected UL carrier are signaled by gNB in RRC Release message and they are considered to be configured for the serving cell from which RRC Release message is received) and CG type 1 resources for SDT are valid and if at least one of the SSBs for which the CG-SDT resources are configured on selected UL carrier has SS-RSRP above cg-SDT-RSRP-ThresholdSSB:

UE selects the CG-SDT procedure for MT-SDT. UE transmits RRC resume request in CG type 1 PUSCH resource of selected UL carrier. CG-SDT resources are signaled by gNB in RRC Release message.

Else if RA-SDT resources (2 step and/or 4 step) are configured on selected UL carrier:

UE selects the RA-SDT procedure for MT-SDT.

If only 2 step RA-SDT resources are configured on the selected UL carrier, UE select 2 step RA-SDT procedure for MT-SDT If only 4 step RA-SDT resources are configured on the selected UL carrier, UE select 4 step RA-SDT procedure for MT-SDT If both 2 step RA-SDT resources and 4 step RA-SDT resources are configured on the selected UL carrier:

If RSRP of the downlink pathloss reference is above msgA-RSRP-Threshold, UE select 2 step RA-SDT procedure for MT-SDT. Otherwise, UE select 4 step RA-SDT procedure for MT-SDT In case of 2 step RA SDT procedure, 2 step Random access resources (preambles/ROs/POs) configured for SDT are used during the random access procedure. UE transmits RRC resume request in MSGA MAC PDU.

In case of 4 step RA SDT procedure, 4 step Random access resources (preambles/ROs) configured for SDT are used during the random access procedure. UE transmits RRC resume request in MSG3 MAC PDU.

Else (i.e. neither 2 step nor 4 step RA-SDT resources are configured on selected UL carrier)

UE selects the regular RACH resources (i.e. non RA-SDT resources) for MT-SDT

If only 2 step RA resources are configured on the selected UL carrier, UE select 2 step RA procedure for MT-SDT If only 4 step RA resources are configured on the selected UL carrier, UE select 4 step RA procedure for MT-SDT If both 2 step RA resources and 4 step RA resources are configured on the selected UL carrier:

If RSRP of the downlink pathloss reference is above msgA-RSRP-Threshold, UE select 2 step RA procedure for MT-SDT. Otherwise, UE select 4 step RA procedure for MT-SDT. A new resume cause can be included in RRC resume request to indicate MT-SDT.

In case of 2 step RA procedure, 2 step Random access resources (preambles/ROs/POs) are used during the random access procedure. UE transmits RRC resume request in MSGA MAC PDU.

In case of 4 step RA procedure, 4 step Random access resources (preambles/ROs) are used during the random access procedure. UE transmits RRC resume request in MSG3 MAC PDU.

In an embodiment, UE is in RRC INACTIVE state. UE receives one of a) indication from upper layer (i.e. NAS) to resume connection or b) paging message including its I-RNTI and MT-SDT (or SDT) indication is received.

If Paging message including I-RNTI and SDT indication is received:

UE selects the UL carrier (NUL or SUL) of the serving cell for SDT. If SUL is not configured in the Serving cell for SDT (currently camped cell is considered as serving cell for SDT) UE selects NUL. If SUL is configured in the Serving cell for SDT and if the RSRP of the downlink pathloss reference is less than sdt-RSRP-ThresholdSSB-SUL, UE selects SUL carrier. If SUL is configured in the Serving cell for SDT and if the RSRP of the downlink pathloss reference is greater than or equal to sdt-RSRP-ThresholdSSB-SUL, UE selects NUL carrier.

If CG-SDT is configured on the selected UL carrier (i.e. CG Type 1 PUSCH resources for selected UL carrier are signaled by gNB and cg-SDT-TimeAlignment-Timer is running. Note that when cg-SDT-TimeAlignmentTimer expires, signaled CG Type 1 PUSCH resources are released by UE and are no longer considered to be configured; Also, the CG type 1 PUSCH resources are signaled in RRC release message and are for the cell from which UE has received that RRC Release message. Also CG Type 1 PUSCH resources for selected UL carrier are signaled by gNB in RRC Release message and they are considered to be configured for the serving cell from which RRC Release message is received) and CG type 1 resources for SDT are valid and if at least one of the SSBs for which the CG-SDT resources are configured on selected UL carrier has SS-RSRP above cg-SDT-RSRP-ThresholdSSB:

UE selects the CG-SDT procedure for SDT. UE transmits RRC resume request in CG type 1 PUSCH resource of selected UL carrier. CG-SDT resources are signaled by gNB in RRC Release message.

Else if RA-SDT resources (2 step and/or 4 step) are configured on selected UL carrier:

UE selects the RA-SDT procedure for SDT.

If only 2 step RA-SDT resources are configured on the selected UL carrier, UE select 2 step RA-SDT procedure for SDT If only 4 step RA-SDT resources are configured on the selected UL carrier, UE select 4 step RA-SDT procedure for SDT If both 2 step RA-SDT resources and 4 step RA-SDT resources are configured on the selected UL carrier:
  If RSRP of the downlink pathloss reference is above msgA-RSRP-Threshold, UE select 2 step RA-SDT procedure for SDT. Otherwise, UE select 4 step RA-SDT procedure for MT-SDT In case of 2 step RA SDT procedure, 2 step Random access resources (preambles/ROs/POs) configured for SDT are used during the random access procedure. UE transmits RRC resume request in MSGA MAC PDU.

In case of 4 step RA SDT procedure, 4 step Random access resources (preambles/ROs) configured for SDT are used during the random access procedure. UE transmits RRC resume request in MSG3 MAC PDU.

Else (i.e. neither 2 step nor 4 step RA-SDT resources are configured on selected UL carrier)

UE selects the regular RACH resources (i.e. non RA-SDT resources) for MT-SDT
  If only 2 step RA resources are configured on the selected UL carrier, UE select 2 step RA procedure for MT-SDT
  If only 4 step RA resources are configured on the selected UL carrier, UE select 4 step RA procedure for MT-SDT
  If both 2 step RA resources and 4 step RA resources are configured on the selected UL carrier:
    If RSRP of the downlink pathloss reference is above msgA-RSRP-Threshold, UE select 2 step RA procedure for MT-SDT. Otherwise, UE select 4 step RA procedure for MT-SDT. A new resume cause can be included in RRC resume request to indicate MT-SDT wherein RRC resume request is transmitted in Msg3 or MsgA.
  In case of 2 step RA procedure, 2 step Random access resources (preambles/ROs/POs) are used during the random access procedure. UE transmits RRC resume request in MSGA MAC PDU.
  In case of 4 step RA procedure, 4 step Random access resources (preambles/ROs) are used during the random access procedure. UE transmits RRC resume request in MSG3 MAC PDU.

Else If indication from upper layer (i.e. NAS) to resume connection is received:
if the data volume of the pending UL data across all RBs configured for SDT is less or equal to sdt-DataVolumeThreshold; and if the RSRP of the downlink pathloss reference is higher than sdt-RSRP-Threshold:
  UE selects the UL carrier (NUL or SUL) of the serving cell for SDT. If SUL is not configured in the Serving cell for SDT (currently camped cell is considered as serving cell for SDT) UE selects NUL. If SUL is configured in the Serving cell for SDT and if the RSRP of the downlink pathloss reference is less than sdt-RSRP-ThresholdSSB-SUL, UE selects SUL carrier. If SUL is configured in the Serving cell for SDT and if the RSRP of the downlink pathloss reference is greater than or equal to sdt-RSRP-ThresholdSSB-SUL, UE selects NUL carrier.
  If CG-SDT is configured on the selected UL carrier (i.e. CG Type 1 PUSCH resources for selected UL carrier are signaled by gNB and cg-SDT-TimeAlignment-Timer is running. Note that when cg-SDT-TimeAlignmentTimer expires, signaled CG Type 1 PUSCH resources are released by UE and are no longer considered to be configured. Also CG Type 1 PUSCH resources for selected UL carrier are signaled by gNB in RRC Release message and they are considered to be configured for the serving cell from which RRC Release message is received) and CG type 1 resources for SDT are valid and if at least one of the SSBs for which the CG-SDT resources are configured on selected UL carrier has SS-RSRP above cg-SDT-RSRP-ThresholdSSB:
    UE selects the CG-SDT procedure for SDT. UE transmits RRC resume request in CG type 1 PUSCH resource of selected UL carrier. CG-SDT resources are signaled by gNB in RRC Release message.
  Else if RA-SDT resources (2 step and/or 4 step) are configured on selected UL carrier:
    UE selects the RA-SDT procedure for MT-SDT.
      If only 2 step RA-SDT resources are configured on the selected UL carrier, UE select 2 step RA-SDT procedure for SDT
      If only 4 step RA-SDT resources are configured on the selected UL carrier, UE select 4 step RA-SDT procedure for SDT
      If both 2 step RA-SDT resources and 4 step RA-SDT resources are configured on the selected UL carrier:
        If RSRP of the downlink pathloss reference is above msgA-RSRP-Threshold, UE select 2 step RA-SDT procedure for SDT. Otherwise, UE select 4 step RA-SDT procedure for SDT
    In case of 2 step RA SDT procedure, 2 step Random access resources (preambles/ROs/POs) configured for SDT are used during the random access procedure. UE transmits RRC resume request in MSGA MAC PDU.
    In case of 4 step RA SDT procedure, 4 step Random access resources (preambles/ROs) configured for SDT are used during the random access procedure. UE transmits RRC resume request in MSG3 MAC PDU.
  Else (i.e. neither 2 step nor 4 step RA-SDT resources are configured on selected UL carrier)
    UE does not initiate SDT procedure. UE initiate the RRC connection resume procedure.

CG-SDT resource validity criteria is same as described above.

In an embodiment, upon receiving the paging message including its I-RNTI and MT-SDT (or SDT) indication, UE operation is as follows:
  if the RSRP of the downlink pathloss reference is higher than sdt-RSRP-Threshold, if configured; or if sdt-RSRP-Threshold is not configured:
    UE selects the UL carrier (NUL or SUL) of the serving cell for SDT. If SUL is not configured in the Serving cell for SDT (currently camped cell is considered as serving cell for SDT) UE selects NUL. If SUL is configured in the Serving cell for SDT and if the RSRP of the downlink pathloss reference is less than sdt-RSRP-ThresholdSSB-SUL, UE selects SUL carrier. If SUL is configured in the Serving cell for SDT and if the RSRP of the downlink pathloss reference is greater than or equal to sdt-RSRP-ThresholdSSB-SUL, UE selects NUL carrier.

If CG-SDT is configured on the selected UL carrier (i.e. CG Type 1 PUSCH resources for selected UL carrier are signaled by gNB and cg-SDT-TimeAlignment-Timer is running. Note that when cg-SDT-Time-AlignmentTimer expires, signaled CG Type 1 PUSCH resources are released by UE and are no longer considered to be configured. Also CG Type 1 PUSCH resources for selected UL carrier are signaled by gNB in RRC Release message and they are considered to be configured for the serving cell from which RRC Release message is received) and CG type 1 resources for SDT are valid and if at least one of the SSBs for which the CG-SDT resources are configured on selected UL carrier has SS-RSRP above cg-SDT-RSRP-ThresholdSSB:
  UE selects the CG-SDT procedure for MT-SDT. UE transmits RRC resume request in CG type 1 PUSCH resource of selected UL carrier. CG-SDT resources are signaled by gNB in RRC Release message.
Else if RA-SDT resources (2 step and/or 4 step) are configured on selected UL carrier:
  UE selects the RA-SDT procedure for MT-SDT.
    If only 2 step RA-SDT resources are configured on the selected UL carrier, UE select 2 step RA-SDT procedure for MT-SDT
    If only 4 step RA-SDT resources are configured on the selected UL carrier, UE select 4 step RA-SDT procedure for MT-SDT
    If both 2 step RA-SDT resources and 4 step RA-SDT resources are configured on the selected UL carrier:
      If RSRP of the downlink pathloss reference is above msgA-RSRP-Threshold, UE select 2 step RA-SDT procedure for MT-SDT. Otherwise, UE select 4 step RA-SDT procedure for MT-SDT
  In case of 2 step RA SDT procedure, 2 step Random access resources (preambles/ROs/POs) configured for SDT are used during the random access procedure. UE transmits RRC resume request in MSGA MAC PDU.
  In case of 4 step RA SDT procedure, 4 step Random access resources (preambles/ROs) configured for SDT are used during the random access procedure. UE transmits RRC resume request in MSG3 MAC PDU.
Else (i.e. neither 2 step nor 4 step RA-SDT resources are configured on selected UL carrier)
  UE does not initiate SDT (i.e. MT-SDT) procedure. UE initiate the RRC connection resume procedure.
  (Alternate) UE selects the regular RACH resources (i.e. non RA-SD T resources) for MT-SDT
    If only 2 step RA resources are configured on the selected UL carrier, UE select 2 step RA procedure for MT-SDT. A new resume cause can be included in RRC resume request to indicate MT-SDT.
    If only 4 step RA resources are configured on the selected UL carrier, UE select 4 step RA procedure for MT-SDT. A new resume cause can be included in RRC resume request to indicate MT-SDT.
    If both 2 step RA resources and 4 step RA resources are configured on the selected UL carrier:
      If RSRP of the downlink pathloss reference is above msgA-RSRP-Threshold, UE select 2 step RA procedure for MT-SDT. Otherwise, UE select 4 step RA procedure for MT-SDT. A new resume cause can be included in RRC resume request to indicate MT-SDT wherein RRC resume request is transmitted in MsgA or Msg3
Else (if sdt-RSRP-Threshold is configured and if the RSRP of the downlink pathloss reference is not higher than sdt-RSRP-Threshold)
  UE does not initiate SDT (i.e. MT-SDT) procedure. UE initiate the RRC connection resume procedure.
  (Alternate) UE selects the regular RACH resources (i.e. non RA-SDT resources) for MT-SDT
    If only 2 step RA resources are configured on the selected UL carrier, UE select 2 step RA procedure for MT-SDT. A new resume cause can be included in RRC resume request to indicate MT-SDT.
    If only 4 step RA resources are configured on the selected UL carrier, UE select 4 step RA procedure for MT-SDT. A new resume cause can be included in RRC resume request to indicate MT-SDT.
    If both 2 step RA resources and 4 step RA resources are configured on the selected UL carrier:
      If RSRP of the downlink pathloss reference is above msgA-RSRP-Threshold, UE select 2 step RA procedure for MT-SDT. Otherwise, UE select 4 step RA procedure for MT-SDT. A new resume cause can be included in RRC resume request to indicate MT-SDT.
  In case of 2 step RA procedure, 2 step Random access resources (preambles/ROs/POs) are used during the random access procedure. UE transmits RRC resume request in MSGA MAC PDU.
  In case of 4 step RA procedure, 4 step Random access resources (preambles/ROs) are used during the random access procedure. UE transmits RRC resume request in MSG3 MAC PDU.
CG-SDT resource validity criteria is same as described above.

In an embodiment, UE is in RRC INACTIVE state. UE receives one of a) indication from upper layer (i.e. NAS) to resume connection or b) paging message including its I-RNTI and MT-SDT (or SDT) indication is received.

If Paging message including I-RNTI and SDT indication is received:
  if the RSRP of the downlink pathloss reference is higher than sdt-RSRP-Threshold, if configured; or if sdt-RSRP-Threshold is not configured:
    UE selects the UL carrier (NUL or SUL) of the serving cell for SDT. If SUL is not configured in the Serving cell for SDT (currently camped cell is considered as serving cell for SDT) UE selects NUL. If SUL is configured in the Serving cell for SDT and if the RSRP of the downlink pathloss reference is less than sdt-RSRP-ThresholdSSB-SUL, UE selects SUL carrier. If SUL is configured in the Serving cell for SDT and if the RSRP of the downlink pathloss reference is greater than or equal to sdt-RSRP-ThresholdSSB-SUL, UE selects NUL carrier.
  If CG-SDT is configured on the selected UL carrier (i.e. CG Type 1 PUSCH resources for selected UL carrier are signaled by gNB and cg-SDT-TimeAlignment-Timer is running. Note that when cg-SDT-Time-AlignmentTimer expires, signaled CG Type 1 PUSCH resources are released by UE and are no longer considered to be configured. Also CG Type 1

PUSCH resources for selected UL carrier are signaled by gNB in RRC Release message and they are considered to be configured for the serving cell from which RRC Release message is received) and CG type 1 resources for SDT are valid and if at least one of the SSBs for which the CG-SDT resources are configured on selected UL carrier has SS-RSRP above cg-SDT-RSRP-ThresholdSSB:

UE selects the CG-SDT procedure for SDT. UE transmits RRC resume request in CG type 1 PUSCH resource of selected UL carrier. CG-SDT resources are signaled by gNB in RRC Release message.

Else if RA-SDT resources (2 step and/or 4 step) are configured on selected UL carrier:

UE selects the RA-SDT procedure for SDT.
  If only 2 step RA-SDT resources are configured on the selected UL carrier, UE select 2 step RA-SDT procedure for SDT
  If only 4 step RA-SDT resources are configured on the selected UL carrier, UE select 4 step RA-SDT procedure for SDT
  If both 2 step RA-SDT resources and 4 step RA-SDT resources are configured on the selected UL carrier:
    If RSRP of the downlink pathloss reference is above msgA-RSRP-Threshold, UE select 2 step RA-SDT procedure for SDT. Otherwise, UE select 4 step RA-SDT procedure for MT-SDT
  In case of 2 step RA SDT procedure, 2 step Random access resources (preambles/ROs/POs) configured for SDT are used during the random access procedure. UE transmits RRC resume request in MSGA MAC PDU.
  In case of 4 step RA SDT procedure, 4 step Random access resources (preambles/ROs) configured for SDT are used during the random access procedure. UE transmits RRC resume request in MSG3 MAC PDU.

Else (i.e. neither 2 step nor 4 step RA-SDT resources are configured on selected UL carrier)

UE does not initiate SDT (i.e. SDT) procedure. UE initiate the RRC connection resume procedure.
(Alternate) UE selects the regular RACH resources (i.e. non RA-SDT resources) for MT-SDT.
  If only 2 step RA resources are configured on the selected UL carrier, UE select 2 step RA procedure for MT-SDT. A new resume cause can be included in RRC resume request to indicate MT-SDT.
  If only 4 step RA resources are configured on the selected UL carrier, UE select 4 step RA procedure for MT-SDT. A new resume cause can be included in RRC resume request to indicate MT-SDT.
  If both 2 step RA resources and 4 step RA resources are configured on the selected UL carrier:
    If RSRP of the downlink pathloss reference is above msgA-RSRP-Threshold, UE select 2 step RA procedure for MT-SDT. Otherwise, UE select 4 step RA procedure for MT-SDT. A new resume cause can be included in RRC resume request to indicate MT-SDT.
  In case of 2 step RA procedure, 2 step Random access resources (preambles/ROs/POs) are used during the random access procedure. UE transmits RRC resume request in MSGA MAC PDU.
  In case of 4 step RA procedure, 4 step Random access resources (preambles/ROs) are used during the random access procedure. UE transmits RRC resume request in MSG3 MAC PDU.

Else (if sdt-RSRP-Threshold is configured and if the RSRP of the downlink pathloss reference is not higher than sdt-RSRP-Threshold)
  UE does not initiate SDT (i.e. MT-SDT) procedure. UE initiate the RRC connection resume procedure.

Else If indication from upper layer (i.e. NAS) to resume connection is received:
  if the data volume of the pending UL data across all RBs configured for SDT is less or equal to sdt-DataVolumeThreshold; and if the RSRP of the downlink pathloss reference is higher than sdt-RSRP-Threshold, if configured:
    UE selects the UL carrier (NUL or SUL) of the serving cell for SDT. If SUL is not configured in the Serving cell for SDT (currently camped cell is considered as serving cell for SDT) UE selects NUL. If SUL is configured in the Serving cell for SDT and if the RSRP of the downlink pathloss reference is less than sdt-RSRP-ThresholdSSB-SUL, UE selects SUL carrier. If SUL is configured in the Serving cell for SDT and if the RSRP of the downlink pathloss reference is greater than or equal to sdt-RSRP-ThresholdSSB-SUL, UE selects NUL carrier.
    If CG-SDT is configured on the selected UL carrier (i.e. CG Type 1 PUSCH resources for selected UL carrier are signaled by gNB and cg-SDT-TimeAlignmentTimer is running. Note that when cg-SDT-TimeAlignmentTimer expires, signaled CG Type 1 PUSCH resources are released by UE and are no longer considered to be configured. Also CG Type 1 PUSCH resources for selected UL carrier are signaled by gNB in RRC Release message and they are considered to be configured for the serving cell from which RRC Release message is received) and CG type 1 resources for SDT are valid and if at least one of the SSBs for which the CG-SDT resources are configured on selected UL carrier has SS-RSRP above cg-SDT-RSRP-ThresholdSSB:
      UE selects the CG-SDT procedure for SDT. UE transmits RRC resume request in CG type 1 PUSCH resource of selected UL carrier. CG-SDT resources are signaled by gNB in RRC Release message.
    Else if RA-SDT resources (2 step and/or 4 step) are configured on selected UL carrier:
      UE selects the RA-SDT procedure for MT-SDT.
        If only 2 step RA-SDT resources are configured on the selected UL carrier, UE select 2 step RA-SDT procedure for SDT
        If only 4 step RA-SDT resources are configured on the selected UL carrier, UE select 4 step RA-SDT procedure for SDT
        If both 2 step RA-SDT resources and 4 step RA-SDT resources are configured on the selected UL carrier:
          If RSRP of the downlink pathloss reference is above msgA-RSRP-Threshold, UE select 2 step RA-SDT procedure for SDT. Otherwise, UE select 4 step RA-SDT procedure for SDT
      In case of 2 step RA SDT procedure, 2 step Random access resources (preambles/ROs/POs) configured for SDT are used during the random access procedure. UE transmits RRC resume request in MSGA MAC PDU.

In case of 4 step RA SDT procedure, 4 step Random access resources (preambles/ROs) configured for SDT are used during the random access procedure. UE transmits RRC resume request in MSG3 MAC PDU.

Else (i.e. neither 2 step nor 4 step RA-SDT resources are configured on selected UL carrier)

UE does not initiate SDT procedure. UE initiate the RRC connection resume procedure. Alternately, UE initiate MT-SDT procedure and uses non SDT RA resources. A new resume cause can be included in RRC resume request message to indicate MT-SDT wherein RRC resume request is transmitted in Msg3 or MsgA.

In an embodiment, upon receiving the paging message including its I-RNTI and MT-SDT (or SDT) indication, UE operation is as follows:

If data is available for any non SDT RBs

UE does not initiate SDT procedure. UE initiate the RRC connection resume procedure Else if the RSRP of the downlink pathloss reference is higher than sdt-RSRP-Threshold, if configured; or if sdt-RSRP-Threshold is not configured:

UE selects the UL carrier (NUL or SUL) of the serving cell for SDT. If SUL is not configured in the Serving cell for SDT (currently camped cell is considered as serving cell for SDT) UE selects NUL. If SUL is configured in the Serving cell for SDT and if the RSRP of the downlink pathloss reference is less than sdt-RSRP-ThresholdSSB-SUL, UE selects SUL carrier. If SUL is configured in the Serving cell for SDT and if the RSRP of the downlink pathloss reference is greater than or equal to sdt-RSRP-ThresholdSSB-SUL, UE selects NUL carrier.

'If data is available for one or more SDT RB(s) and if the data volume of the pending UL data across all RBs configured for SDT is less or equal to sdt-DataVolumeThreshold' OR 'If data is not available for one or more SDT RB(s)':

If CG-SDT is configured on the selected UL carrier (i.e. CG Type 1 PUSCH resources for selected UL carrier are signaled by gNB and cg-SDT-TimeAlignmentTimer is running. Note that when cg-SDT-TimeAlignmentTimer expires, signaled CG Type 1 PUSCH resources are released by UE and are no longer considered to be configured. Also CG Type 1 PUSCH resources for selected UL carrier are signaled by gNB in RRC Release message and they are considered to be configured for the serving cell from which RRC Release message is received) and CG type 1 resources for SDT are valid and if at least one of the SSBs for which the CG-SDT resources are configured on selected UL carrier has SS-RSRP above cg-SDT-RSRP-ThresholdSSB:

UE selects the CG-SDT procedure for MT-SDT. UE transmits RRC resume request in CG type 1 PUSCH resource of selected UL carrier. CG-SDT resources are signaled by gNB in RRC Release message.

Else if RA-SDT resources (2 step and/or 4 step) are configured on selected UL carrier:

UE selects the RA-SDT procedure for MT-SDT.

If only 2 step RA-SDT resources are configured on the selected UL carrier, UE select 2 step RA-SDT procedure for MT-SDT If only 4 step RA-SDT resources are configured on the selected UL carrier, UE select 4 step RA-SDT procedure for MT-SDT If both 2 step RA-SDT resources and 4 step RA-SDT resources are configured on the selected UL carrier:

If RSRP of the downlink pathloss reference is above msgA-RSRP-Threshold, UE select 2 step RA-SDT procedure for MT-SDT. Otherwise, UE select 4 step RA-SDT procedure for MT-SDT In case of 2 step RA SDT procedure, 2 step Random access resources (preambles/ROs/POs) configured for SDT are used during the random access procedure. UE transmits RRC resume request in MSGA MAC PDU.

In case of 4 step RA SDT procedure, 4 step Random access resources (preambles/ROs) configured for SDT are used during the random access procedure. UE transmits RRC resume request in MSG3 MAC PDU.

Else (i.e. neither 2 step nor 4 step RA-SDT resources are configured on selected UL carrier)

UE does not initiate SDT (i.e. MT-SDT) procedure. UE initiate the RRC connection resume procedure.

Else If data is available for one or more SDT RB(s) and if the data volume of the pending UL data across all RBs configured for SDT is greater than sdt-DataVolumeThreshold;

UE does not initiate SDT procedure. UE initiate the RRC connection resume procedure.

Else (i.e. if sdt-RSRP-Threshold is configured and if the RSRP of the downlink pathloss reference is not higher than sdt-RSRP-Threshold)

UE does not initiate SDT (i.e. MT-SDT) procedure. UE initiate the RRC connection resume procedure. Alternately, UE initiate MT-SDT procedure and uses non SDT RA resources. A new resume cause can be included in RRC resume request message to indicate MT-SDT wherein RRC resume request is transmitted in Msg3 or MsgA.

CG-SDT resource validity criteria is same as described above.

In an embodiment, upon receiving the paging message including its I-RNTI and MT-SDT (or SDT) indication, UE operation is as follows If data is available for any non SDT RBs:

no SDT. Perform regular resume procedure.

Else (data is not available for non SDT RBs)

UE first select the UL carrier

If data is available for SDT RBs

If CG-SDT resources are configured on selected UL carrier and TA is valid and UE is in same cell as the cell from which UE has last received RRC Release message and data volume across all SDT RBs is less than threshold and DL RSRP is greater than a threshold:
    CG-SDT is selected
Else if RA-SDT resources are configured on selected UL carrier and data volume across all SDT RBs is less than threshold and DL RSRP is greater than a threshold
    RA-SDT is selected
Else
    No SDT. Perform regular resume procedure.
If data is not available for SDT RBs
    If CG-SDT resources are configured on selected UL carrier and TA is valid and UE is in same cell as the cell from which UE has last received RRC Release message and DL RSRP is greater than a threshold:
        CG-SDT is selected
    Else if RA-SDT resources are configured on selected UL carrier and DL RSRP is greater than a threshold
        RA-SDT is selected
    Else
        No SDT. Perform regular resume procedure. Alternately, UE initiate MT-SDT procedure and uses non SDT RA resources. A new resume cause can be included in RRC resume request message to indicate MT-SDT wherein RRC resume request is transmitted in Msg3 or MsgA.

In an embodiment, CG-SDT resources are separately configured for MO SDT and MT SDT. UE selects CG-SDT resources configured for MT SDT when CG-SDT is selected upon receiving the paging message including its I-RNTI and MT-SDT (or SDT) indication. UE selects CG-SDT resources configured for MO SDT when CG-SDT is selected upon initiation of SDT procedure which is not triggered by paging message. CG-SDT selection is as per the criteria explained earlier as per various embodiments.

In an embodiment, RA-SDT resources are separately configured for MO SDT and MT SDT. UE selects RA-SDT resources configured for MT SDT when RA-SDT is selected upon receiving the paging message including its I-RNTI and MT-SDT (or SDT) indication. UE selects RA-SDT resources configured for MO SDT when RA-SDT is selected upon initiation of SDT procedure which is not triggered by paging message.

In an embodiment, network (i.e. gNB) can indicate whether CG-SDT resources configured are applicable for MO-SDT or MT-SDT or both. In an embodiment, network (i.e. gNB) can indicate whether RA-SDT resources configured are applicable for MO-SDT or MT-SDT or both. In an embodiment, network can indicate whether UE should use RA-SDT or CG-SDT in paging message wherein the paging message including its I-RNTI and MT-SDT (or SDT) indication. For RA-SDT, network can further indicate whether to use 2SRA-SDT or 4SRA-SDT. These indications in paging message can be common for all UEs paged by the paging message or these indications can be separate for each UE paged by the paging message. Note that Paging message include one or more paging records where each paging record is for one UE.

In an embodiment, network can indicate (in RRC Release message or RRC Reconfiguration message) the RBs for which MT-SDT is applied. Upon receiving the paging message including its I-RNTI and MT-SDT (or SDT) indication, when SDT procedure is initiated UE re-establishes and resumes PDCP entity and RLC entity of the RBs for which MT-SDT is applied.

In an embodiment, RSRP threshold (sdt-RSRP-Threshold) for SDT selection (in above procedure) can be separately configured for MO-SDT and MT-SDT. If sdt-RSRP-Threshold is not configured for MT-SDT, UE applies the sdt-RSRP-Threshold configured for MO-SDT, if configured. If sdt-RSRP-Threshold is not configured for MT-SDT and MO-SDT, UE does not apply the sdt-RSRP-Threshold configured for SDT.

In an embodiment, operation for SDT failure detection timer, PDCCH monitoring, re-establishments of RB(s) upon initiating the SDT procedure for MT-SDT is same as the procedure applied for MO-SDT.

Figure 4:
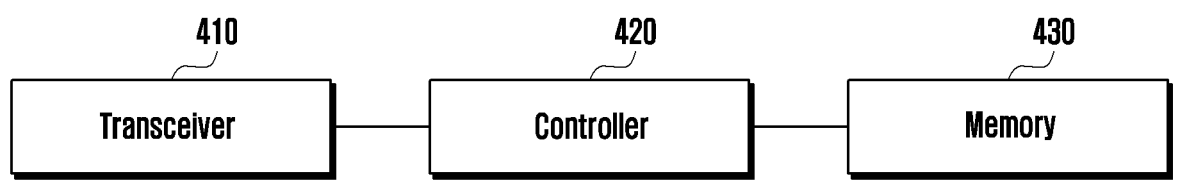
FIG. 4 illustrates a block diagram of a terminal according to an embodiment of the disclosure.

FIG. 4 illustrates a block diagram of a terminal according to an embodiment of the disclosure.

Referring to FIG. 4, a terminal includes a transceiver 410, a controller 420 and a memory 430. The controller 420 may refer to a circuitry, an application-specific integrated circuit (ASIC), or at least one processor. The transceiver 410, the controller 420 and the memory 430 are configured to perform the operations of the UE illustrated in the figures, e.g. FIGS. 1 to 3, or described above. Although the transceiver 410, the controller 420 and the memory 430 are shown as separate entities, they may be realized as a single entity like a single chip. Or, the transceiver 410, the controller 420 and the memory 430 may be electrically connected to or coupled with each other.

The transceiver 410 may transmit and receive signals to and from other network entities, e.g., a base station.

The controller 420 may control the UE to perform functions according to one of the embodiments described above.

In an embodiment, the operations of the terminal may be implemented using the memory 430 storing corresponding program codes. Specifically, the terminal may be equipped with the memory 430 to store program codes implementing desired operations. To perform the desired operations, the controller 420 may read and execute the program codes stored in the memory 430 by using a processor or a central processing unit (CPU).

Figure 5:
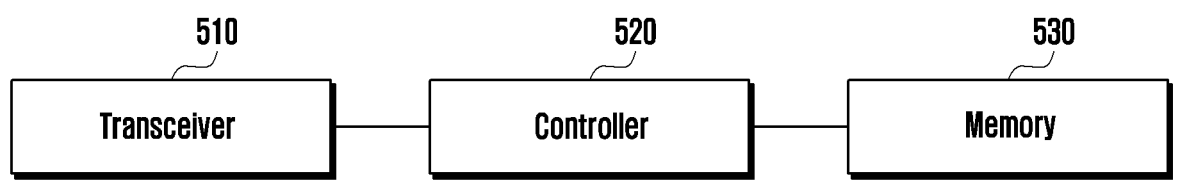
FIG. 5 illustrates a block diagram of a base station according to an embodiment of the disclosure.

FIG. 5 illustrates a block diagram of a base station according to an embodiment of the disclosure.

Referring to FIG. 5, a base station includes a transceiver 510, a controller 520 and a memory 530. The transceiver 510, the controller 520 and the memory 530 are configured to perform the operations of the network (e.g., gNB) illustrated in the figures, e.g. FIGS. 1 to 3, or described above. Although the transceiver 510, the controller 520 and the memory 530 are shown as separate entities, they may be realized as a single entity like a single chip. The transceiver 510, the controller 520 and the memory 530 may be electrically connected to or coupled with each other.

The transceiver 510 may transmit and receive signals to and from other network entities, e.g., a terminal, UPF, or AMF.

The controller 520 may control the base station to perform functions according to one of the embodiments described above. The controller 520 may refer to a circuitry, an ASIC, or at least one processor.

For example, the controller 520 is configured to receive, via the transceiver, a downlink (DL) data for a user equipment (UE), determine whether a volume of the downlink data is less than a data volume threshold, and in case that the volume of the downlink data is less than the data volume threshold, transmit, to the UE via the transceiver, a paging message including an inactive radio network temporary identifier (I-RNTI) and a mobile terminated small data transmission (MT-SDT) indication.

In an embodiment, the operations of the base station may be implemented using the memory 530 storing corresponding program codes. Specifically, the base station may be equipped with the memory 530 to store program codes implementing desired operations. To perform the desired operations, the controller 520 may read and execute the program codes stored in the memory 530 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first base station in a mobile communication system, the method comprising:
    receiving, from a second base station, a radio access network (RAN) paging message on an Xn interface, the RAN paging message including an inactive-radio network temporary identifier (I-RNTI) for a user equipment (UE) and information indicating a size of downlink (DL) data;
    determining to trigger a mobile terminated small data transmission (MT-SDT) paging for the UE based on the size of the DL data; and
    transmitting, to the UE, a paging message including the I-RNTI and an MT-SDT indication.

2. The method of claim 1,
    wherein the second base station is a last serving base station for the UE, and
    wherein the first base station and the second base station are within a RAN notification area (RNA).

3. The method of claim 1, wherein the DL data comprises DL user data from a user plane function (UPF).

4. The method of claim 1, wherein the DL data comprises a DL UE associated signaling message from an access and mobility management function (AMF).

5. The method of claim 1, wherein the size of the DL data is represented in bytes.

6. A first base station in a mobile communication system, the first base station comprising:
    a transceiver; and
    a controller configured to:
        receive, from a second base station via the transceiver, a radio access network (RAN) paging message on an Xn interface, the RAN paging message including an inactive-radio network temporary identifier (I-RNTI) for a user equipment (UE) and information indicating a size of downlink (DL) data,
        determine to trigger a mobile terminated small data transmission (MT-SDT) paging for the UE based on the size of the DL data, and
        transmit, to the UE via the transceiver, a paging message including the I-RNTI and an MT-SDT indication.

7. The first base station of claim 6,
    wherein the second base station is a last serving base station for the UE, and
    wherein the first base station and the second base station are within a RAN notification area (RNA).

8. The first base station of claim 6, wherein the DL data comprises DL user data from a user plane function (UPF).

9. The first base station of claim 6, wherein the DL data comprises a DL UE associated signaling message from an access and mobility management function (AMF).

10. The first base station of claim 6, wherein the size of the DL data is represented in bytes.

11. A method performed by a second base station in a mobile communication system, the method comprising:
    receiving downlink (DL) data for a user equipment (UE) from an access and mobility management function (AMF) or from a user plane function (UPF);
    generating a radio access network (RAN) paging message including an inactive-radio network temporary identifier (I-RNTI) for the UE and information indicating a size of the DL data; and
    transmitting, to a first base station, the RAN paging message on an Xn interface, the RAN paging message including the I-RNTI and the information indicating the size of the DL data,
    wherein the I-RNTI and the size of the DL data are associated with triggering a mobile terminated small data transmission (MT-SDT) paging for the UE.

12. The method of claim 11, wherein the second base station is a last serving base station for the UE, and
    wherein the first base station and the second base station are within a RAN notification area (RNA).

13. The method of claim 11, wherein the DL data comprises DL user data from the UPF.

14. The method of claim 11, wherein the DL data comprises a DL UE associated signaling message from the AMF.

15. The method of claim 11, wherein the size of the DL data is represented in bytes.

16. A second base station in a mobile communication system, the second base station comprising:
    a transceiver; and
    a controller configured to:
        receive, from an access and mobility management function (AMF) or from a user plane function (UPF) via the transceiver, downlink (DL) data for a user equipment (UE),
        generate a radio access network (RAN) paging message including an inactive-radio network temporary identifier (I-RNTI) for the UE and information indicating a size of the DL data, and
        transmit, to a first base station via the transceiver, the RAN paging message on an Xn interface, the RAN paging message including the I-RNTI and the information indicating the size of the DL data,
    wherein the I-RNTI and the size of the DL data are associated with triggering a mobile terminated small data transmission (MT-SDT) paging for the UE.

17. The second base station of claim 16, wherein the second base station is a last serving base station for the UE, and
    wherein the first base station and the second base station are within a RAN notification area (RNA).

18. The second base station of claim 16, wherein the DL data comprises DL user data from the UPF.

19. The second base station of claim 16, wherein the DL data comprises a DL UE associated signaling message from the AMF.

20. The second base station of claim 16, wherein the size of the DL data is represented in bytes.

* * * * *